(12) United States Patent
Wu

(10) Patent No.: US 7,043,655 B2
(45) Date of Patent: May 9, 2006

(54) REDUNDANT CLOCK SYNTHESIZER

(75) Inventor: Chung-Hsiao R. Wu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 533 days.

(21) Appl. No.: 10/288,938

(22) Filed: Nov. 6, 2002

(65) Prior Publication Data

US 2004/0088597 A1   May 6, 2004

(51) Int. Cl.
*G06F 1/12*   (2006.01)
*H03K 19/003*   (2006.01)

(52) U.S. Cl. ...................... 713/501; 327/152; 327/298; 327/156; 326/10; 375/356; 331/49; 331/55

(58) Field of Classification Search ................ 713/500; 331/158
See application file for complete search history.

(56) References Cited

U.S. PATENT DOCUMENTS

| | | | |
|---|---|---|---|
| 5,210,680 A | | 5/1993 | Scheibler |
| 5,363,484 A | | 11/1994 | Desnoyers et al. |
| 5,562,410 A | | 10/1996 | Sachs et al. |
| 5,689,536 A | * | 11/1997 | Iyota et al. ................ 331/49 |
| 5,774,705 A | | 6/1998 | Leshem |
| 5,828,243 A | | 10/1998 | Bagley |
| 5,886,557 A | | 3/1999 | Wilcox |
| 5,918,229 A | | 6/1999 | Davis et al. |
| 6,014,319 A | | 1/2000 | Kuchta et al. |
| 6,035,414 A | | 3/2000 | Okazawa et al. |
| 6,061,752 A | | 5/2000 | Jones et al. |
| 6,107,855 A | | 8/2000 | Wilcox |
| 6,194,969 B1 | * | 2/2001 | Doblar ........................ 331/2 |
| 6,209,051 B1 | | 3/2001 | Hill et al. |
| 6,216,236 B1 | | 4/2001 | Miyao et al. |
| 6,349,391 B1 | | 2/2002 | Petivan et al. |
| 6,354,861 B1 | | 3/2002 | Schmitt et al. |

(Continued)

FOREIGN PATENT DOCUMENTS

EP         0691671         1/1996

(Continued)

OTHER PUBLICATIONS

"Virtual Midplane Realizes Ultrafast Card Interconnects"; Electronic Design (ED Online # 1771); Dec. 9, 2002; Michael Fowler; Copyright © 2004; Penton Media, Inc.

*Primary Examiner*—Lynne H. Browne
*Assistant Examiner*—Anand B. Patel
(74) *Attorney, Agent, or Firm*—Meyertons Hood Kivlin Kowert & Goetzel, P.C.; B. Noël Kivlin; Erik A. Heter

(57) ABSTRACT

A clock architecture employing redundant clock synthesizers is disclosed. In one embodiment, a computer system includes first and second clock boards. The first clock board may act as a master, generating a system clock signal, while the second clock board acts as a slave. The first clock board may monitor a phase difference between a first crystal clock signal and a feedback clock signal. If the phase difference exceeds a limit, the first crystal clock signal may be inhibited, preventing the first clock board from generating the system clock signal. The second clock board may monitor the system clock board in reference to a feedback clock signal. If the second clock board detects a predetermined number of consecutive missing clock edges, it may enable a second crystal clock signal, which may be used to generate a system clock signal.

24 Claims, 15 Drawing Sheets

U.S. PATENT DOCUMENTS

| | | |
|---|---|---|
| 6,381,174 B1 | 4/2002 | Roohparvar et al. |
| 6,421,215 B1 | 7/2002 | Bushue |
| 6,422,876 B1 | 7/2002 | Fitzgerald et al. |
| 6,485,309 B1 | 11/2002 | Edholm |
| 6,574,695 B1 | 6/2003 | Mott et al. |
| 6,574,748 B1 | 6/2003 | Andress et al. |
| 6,741,109 B1 * | 5/2004 | Huang et al. ............... 327/156 |
| 2001/0030942 A1 | 10/2001 | Katsuyuki |
| 2002/0162083 A1 | 10/2002 | Fowler |
| 2003/0002541 A1 | 1/2003 | Fowler et al. |
| 2003/0224630 A1 | 12/2003 | Dean |
| 2004/0001303 A1 | 1/2004 | Doblar et al. |
| 2004/0001311 A1 | 1/2004 | Doblar et al. |
| 2004/0002237 A1 | 1/2004 | Doblar et al. |
| 2004/0003158 A1 | 1/2004 | Doblar et al. |

FOREIGN PATENT DOCUMENTS

| | | |
|---|---|---|
| EP | 1176514 A1 | 1/2002 |
| WO | 00/70460 | 11/2000 |

* cited by examiner

REDUNDANT CLOCK SYNTHESIZER

BACKGROUND OF THE INVENTION

1. Field of the Invention

This invention relates to clocking for computer systems, and more particularly, to clock generation and redundancy.

2. Description of the Related Art

High availability computer systems such as file servers typically require reliable power and clocking. Power and/or clock failures may result in system down time. In some systems, even a momentary interruption in power or clocking may result in a system crash. In order to prevent system down time, redundancy may be built into the power and/or clocking circuitry.

Redundancy for clocking of a computer system may be provided using multiple clock boards. Each of the clock boards may include detection circuitry for detecting the presence of a clock signal which is provided to the computer system. One clock board may act as a primary clock board, with one or more clock boards acting as secondary clock boards. If the primary clock board fails, one of the secondary clock boards may detect this failure and take over as the primary clock board.

Some clock boards use clock synthesizers in order to generate a clock signal at the necessary frequency and amplitude. Many such clock synthesizers suffer from various drawbacks. Often times, clocking in a computer system cannot be protected from frequency drift that may occur in an output clock signal of a clock synthesizer. If the frequency drifts outside a certain range, system operation may be adversely affected. A clock synthesizer often times cannot be used as a clock follower or as a redundant clock source, and may thus necessitate the need for additional circuitry in computer systems where clocking redundancy is required. Since a clock synthesizer may not be useful for providing clock redundancy on its own, use of a voltage controlled crystal oscillator (VCXO) may be required, which may not be cost effective. Furthermore, additional circuitry may require a higher component count and use up more area of a printed circuit board that may otherwise be used to provide additional functionality.

SUMMARY OF THE INVENTION

A clock architecture employing redundant clock synthesizers is disclosed. h one embodiment, a computer system includes first and second clock boards coupled to one or more side plane boards. Both clock boards may include a crystal and a clock synthesizer coupled to receive a crystal clock signal from the crystal. The clock synthesizer may be used to generate a system clock signal. The first clock board may operate as a master while the second clock board operates as a slave. The clock synthesizer of the first clock board may determine a phase relationship between the received crystal clock signal and a feedback clock signal (based on the system clock signal). If the phase relationship exceeds a predetermined limit, the clock synthesizer may inhibit the crystal clock signal from passing to a phase locked loop and thus prevent generation of the system clock signal. The clock synthesizer of the second clock board may monitor its respective crystal clock signal in reference to the system clock signal. If the clock synthesizer of the second clock board detects a predetermined number of consecutive missing edges of the system clock signal from the first clock board, it may enable the crystal clock signal from its respective crystal to be used to generate a system clock signal. Thus, the second clock board may act as the master responsive to the inhibiting of the crystal clock signal on the first clock board.

BRIEF DESCRIPTION OF THE DRAWINGS

Other aspects of the invention will become apparent upon reading the following detailed description and upon reference to the accompanying drawings in which.

Other aspects of the invention will become apparent upon reading the following detailed description and upon reference to the accompanying drawings in which.

Figure 1:
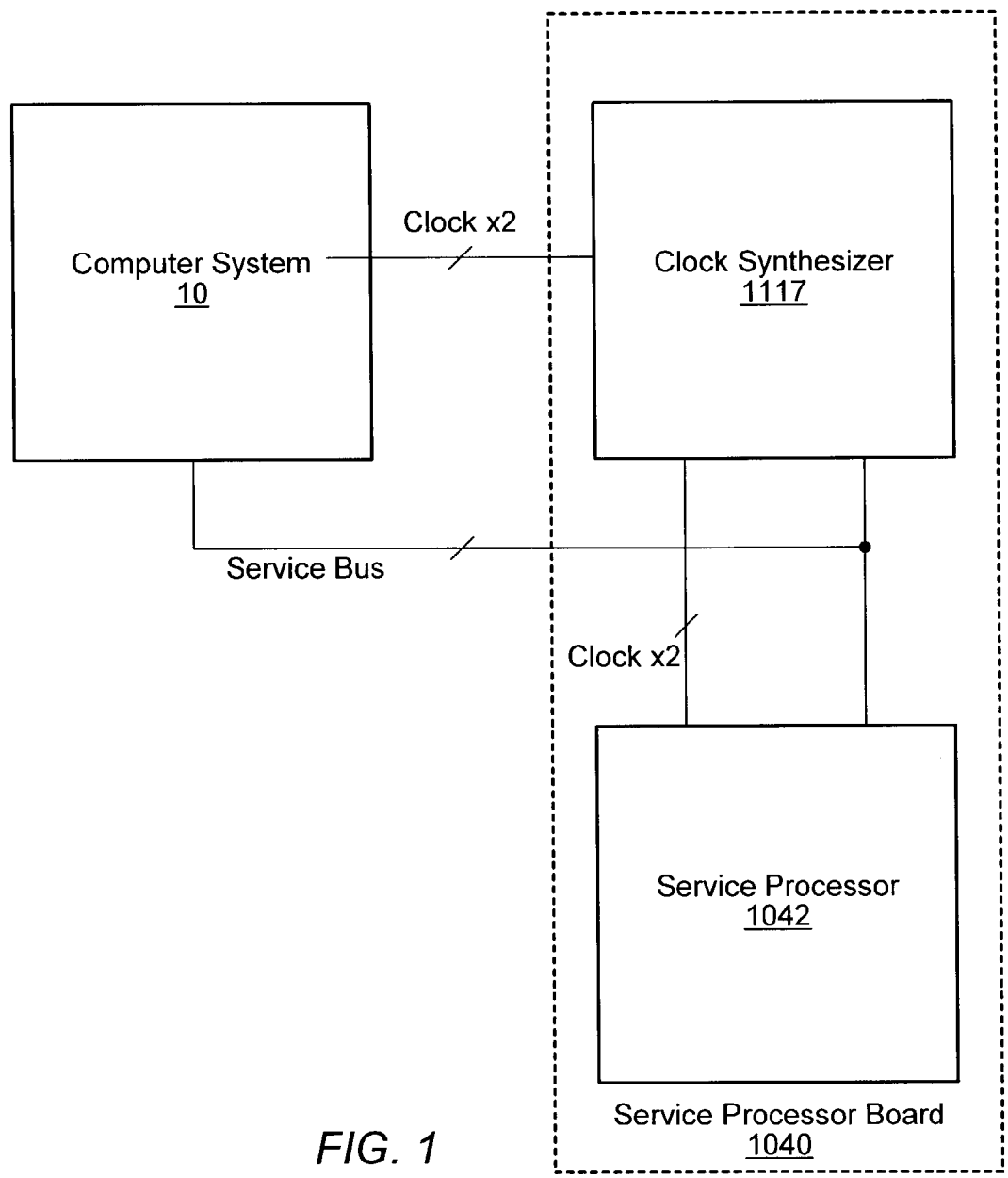
FIG. 1 is a block diagram of one embodiment of a computer system and a service processor board.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

FIG. 1 is a block diagram of one embodiment of a computer system coupled to a redundant clock synthesizer and a service processor board. In the embodiment shown, computer system 10 is coupled to service processor board 1040 by a service bus and clock lines. Computer system 10 may be one of several different types of computers, one such embodiment of which will be discussed below in reference to FIG. 2.

Computer system 10 may be coupled to receive clock signals from clock synthesizer 1117 on service processor board 1040. In the embodiment shown, computer system 10 may receive two separate clock signals from clock synthesizer 1117. The separate clock signals may have different frequencies in some embodiments. In other embodiments, the separate clock signals may be of the same frequency but different phases. Still further, it is also possible and contemplated that the separate clock signals may represent a master clock signal and a slave clock signal. While two separate clock signals may be conveyed from clock synthesizer 1117 to computer system 10 in this embodiment, other embodiments are possible and contemplated wherein a greater or lesser number of clock signals are conveyed from the clock synthesizer to the computer system.

Service processor 1042 may also be coupled clock synthesizer 1117 and may also be coupled to receive (in this particular embodiment) two separate clock signals. Similar to that noted above, embodiments are possible and contemplated wherein a greater or lesser number of clock signals are conveyed from clock synthesizer 1117 to service processor 1042. Service processor 1042 may also be coupled to computer system 10 and clock synthesizer 1117 by a service bus. Through the service bus, service processor 1042 may be perform various system servicing functions, such as invoking built-in self tests and so forth. Service processor 1042 may also receive information from computer system 10 related to its state of operation.

Figure 2:
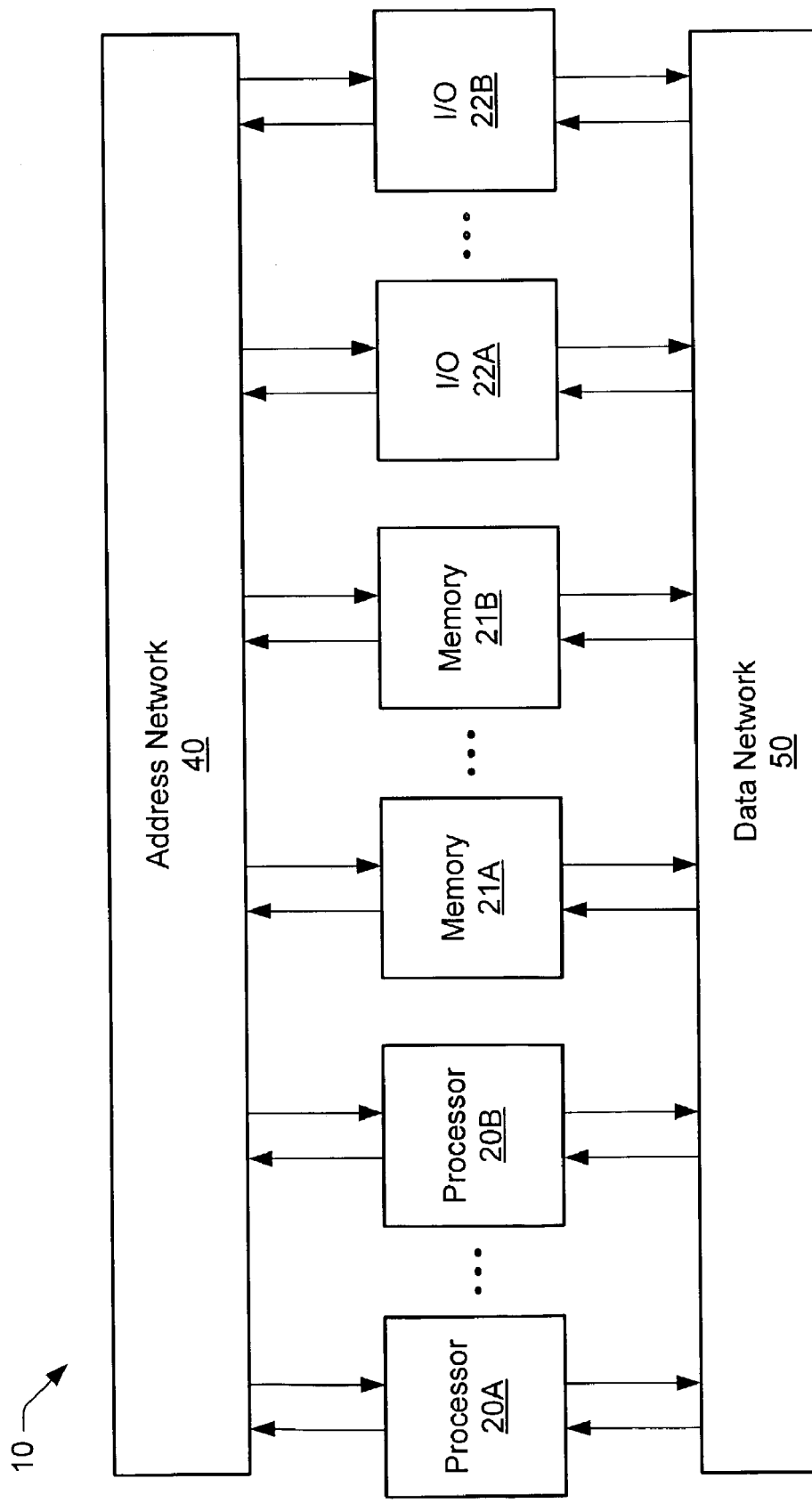
FIG. 2 is a block diagram of one embodiment of a computer system.

Turning now to FIG. 2, a block diagram of one embodiment of a computer system 10 is shown. Computer system 10 includes multiple client subsystems interconnected through an address network 40 and a data network 50. The embodiment of FIG. 1 may be considered a logical representation of computer system 10. The client subsystems include processor 20A and 20B, memory subsystems 21A and 21B and I/O subsystems 22A and 22B. It is noted that each of the subsystems may be referred to as a client device. It is noted that, although six client devices are shown in FIG. 1, embodiments of computer system 10 employing any number of client devices and different combinations of client device types are contemplated. Elements referred to herein with a particular reference number followed by a letter may be collectively referred to by the reference number alone. For example, processor subsystems 20A–B may be collectively referred to as processor subsystems 20. In the present embodiment, computer system 10 is a single multiprocessor node operating in a stand-alone configuration. In other embodiments however, computer system 10 may be connected to other nodes.

Generally speaking, each of processor subsystems 20 and I/O subsystems 22 may access each of memory subsystems 21. Devices configured to perform accesses to memory subsystems 21 are referred to herein as "active" devices. Each client in FIG. 1 may be configured to convey address transactions on address network 40 and data transactions on data network 50 using split-transaction packets. Each processor subsystem 20 in the illustrated embodiment may include a processor (not shown in FIG. 1). Processor subsystems 20 may further include one or more instruction and data caches which may be configured in any of a variety of specific cache arrangements. For example, set-associative or direct-mapped configurations may be employed by the caches within processor subsystems 20.

Memory subsystems 21 are configured to store data and instruction code for use by processor subsystems 20 and I/O subsystems 22. Memory subsystems 21 preferably comprise dynamic random access memory (DRAM), although other types of memory may be used. In addition, the memory within memory subsystems 21 may be configured using dual in-line memory modules (DIMM). Each address in the address space of computer system 10 may be assigned to a particular memory subsystem, referred to as the home subsystem of the address.

I/O subsystem clients 22 may each be illustrative of a peripheral device such as, for example, an input-output bridge, a graphics device, a networking device, etc. In various embodiments, I/O subsystems 22 may each include a cache memory subsystem similar to those of processor subsystems 20 for caching data associated with addresses mapped within one of the memory subsystems.

In one embodiment, data network 50 is a point-to-point switched network. However, it is noted that in alternative embodiments other networks may be used. In a switched network, a particular client device communicates directly with a second client device via a dedicated point-to-point link that may be established through a switched interconnect mechanism. To communicate with a third client device, the particular client device utilizes a different link, as established by the switched interconnect, other than the one used to communicate with the second client device.

In the embodiment of FIG. 2, address network 40 may implement a broadcast network in which address transactions are conveyed to all client devices. Address network 30 may be embodied physically using a point-to-point, switched network configured to broadcast address transactions. Address network 40, as well as data network 50, may be implemented using a multi-stage switching hierarchy. In alternative embodiments, address network 40 may be implemented using a common bus structure. Address network 40 may be embodied in hardware that is separate from data network 50, or in hardware that is shared with data network 50.

Address network 40 accommodates communication between processing subsystems 20, memory subsystems 21, and I/O subsystems 22. Operations upon address network 40 are generally referred to as address transactions. When the destination of an address transaction is a storage location within a memory subsystem 21, the destination may be specified via an address conveyed with the transaction upon address network 40. Subsequently, data corresponding to the transaction on the address network 40 may be conveyed upon data network 50.

Figure 3:
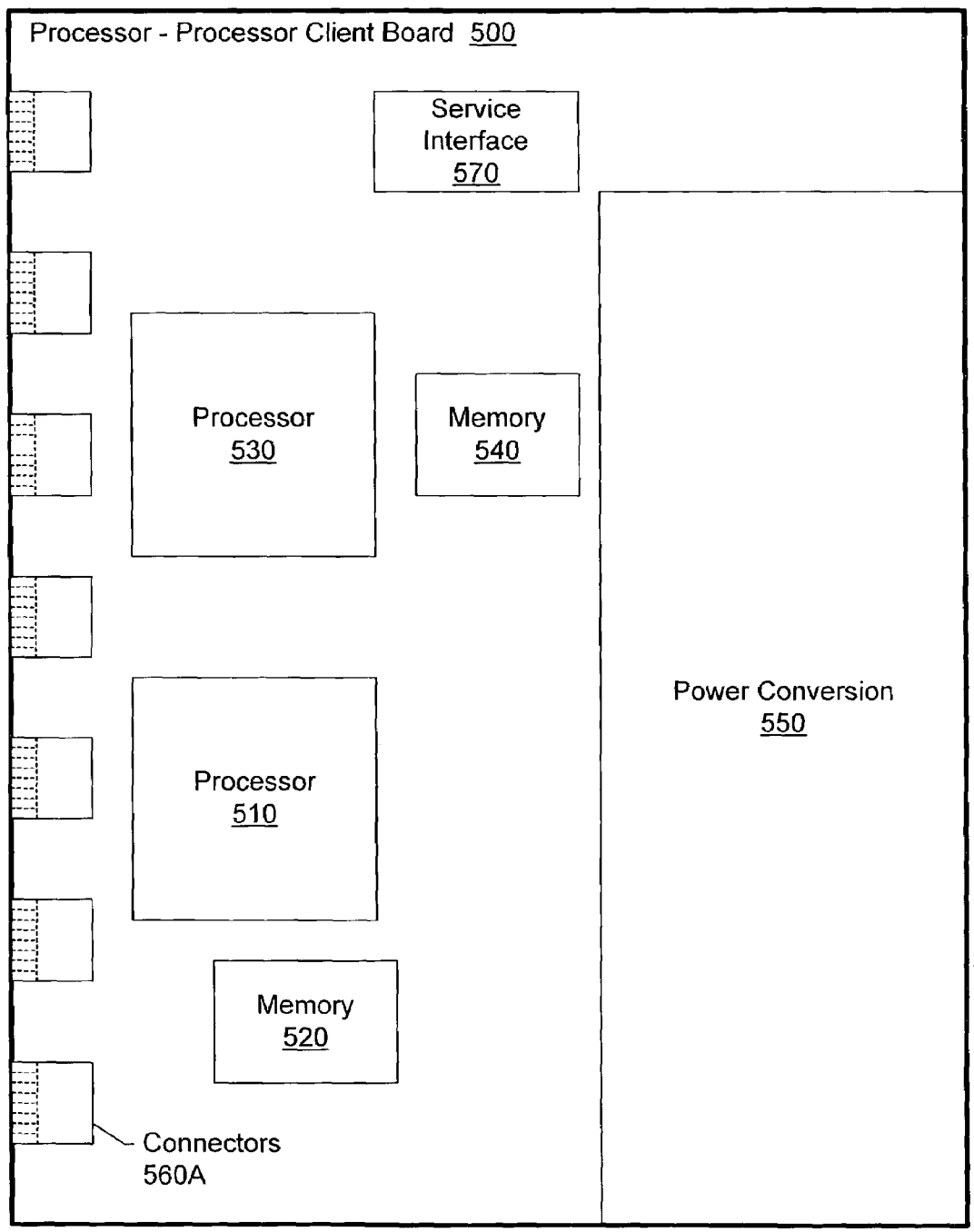
FIG. 3 is a diagram of one embodiment of a dual client processor board of a computer system.

Turning to FIG. 3, a diagram of one embodiment of a dual client processor board 500 of a computer system is shown. The dual client processor board 500 is a circuit board which includes two processors, such as the processors of the computer systems illustrated in FIG. 1 and FIG. 2. Each processor on dual client processor board 500 is an independent processor client. The first processor client includes a processor 510 and a memory 520. The second processor client also includes a processor 530 and a memory 540. In addition, dual processor client board 500 includes a power conversion block 550 and a service interface 560. Dual client processor board 500 connects to the rest of the computer system via a plurality of connectors 570.

Processor 510 and processor 530 are each illustrative of, for example, an UltraSPARC™ microprocessor such as an UltraSPARC™ 5 microprocessor by Sun Microsystems, Inc. It is contemplated however, that in other embodiments, other processors may be used.

Memory 520 may be used as a cache memory for processor 510 as described above in conjunction with the description of FIG. 1. Memory 520 may be implemented in static random access memory (SRAM). Likewise, memory 540 may be used as a cache memory for processor 530 and may be implemented in static random access memory (SRAM).

Power conversion block 550 may be a DC to DC converter configured to provide a DC operating voltage for components on the dual client processor board 500. In one embodiment, power conversion block 550 may convert 48VDC to 1VDC. As will be described in greater detail below, redundant 48V power distribution boards may supply 48V to each client board in the computer system. Power conversion block 550, receives the redundant 48V and converts it to a single 1VDC supply. It is contemplated that in other embodiments, power conversion block may provide other suitable voltages as necessary. Further, in an alternative embodiment, power conversion block may provide redundant 1VDC supplies.

Service interface 570 is a service module configured to provide a service interface from each client, which in the illustrated embodiment are processors, to a service processor board (not shown in FIG. 3) via a special service bus (not shown). In one embodiment, service interface 570 may be a custom integrated circuit configured to translate communications between the service bus protocol and the protocol used by processor 510 and 530. As will be described in greater detail below, the service interface may allow the service processor to configure processor 510 and 530 into system domains and to diagnose failures on dual client processor board 500.

Figure 5:
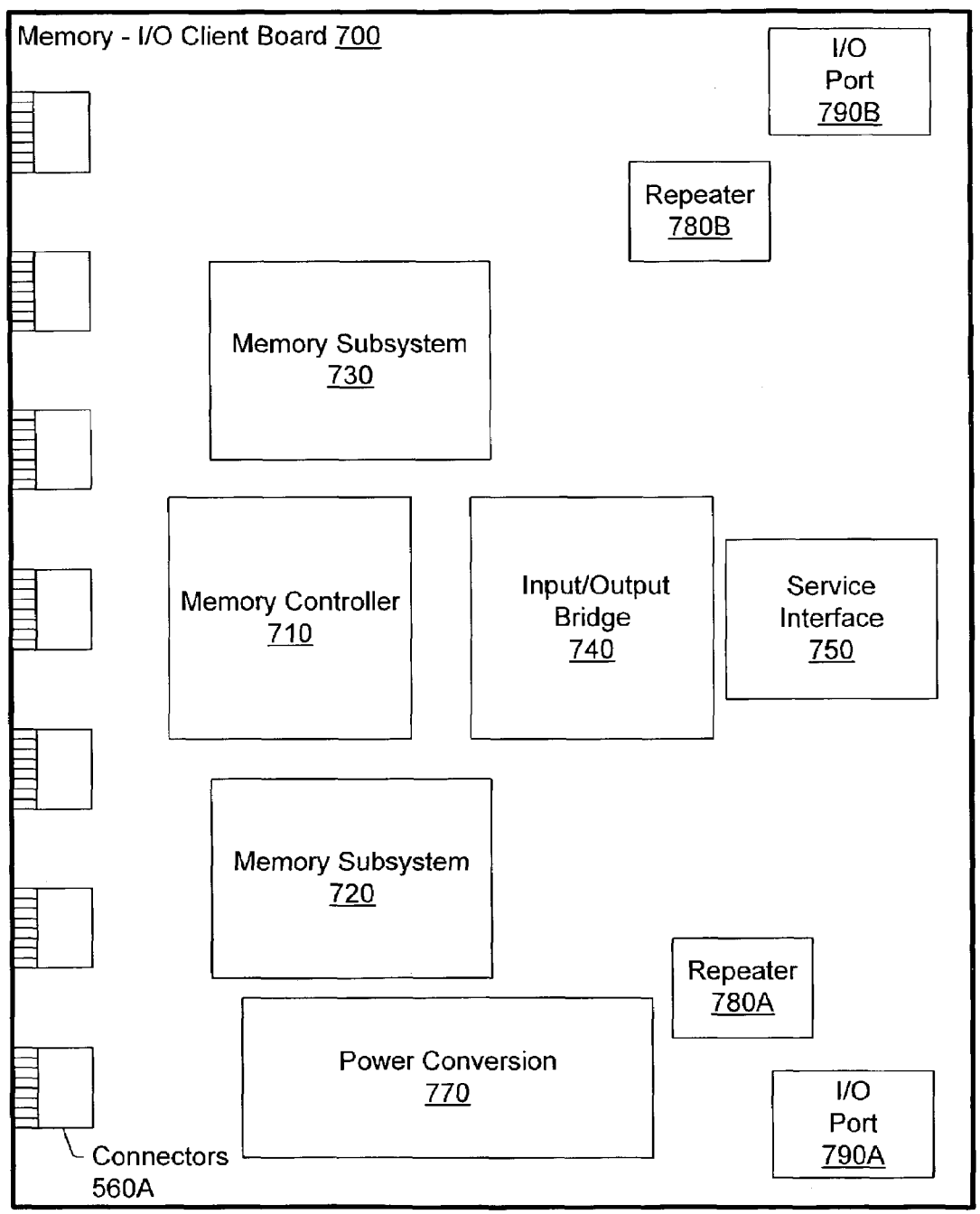
FIG. 5 is a diagram of one embodiment of a dual client memory-I/O board of a computer system.

Connectors 560A are configured to convey power, ground and signal information between dual client processor board 500 and switch and power boards (not shown in FIG. 5). Each of connectors 560A may be physically arranged along one edge and mounted to one side of dual client processor board 500. As will be described in further detail below, each of connectors 560A may be detachably mated to a corresponding connector on the switch and power boards.

Figure 4:
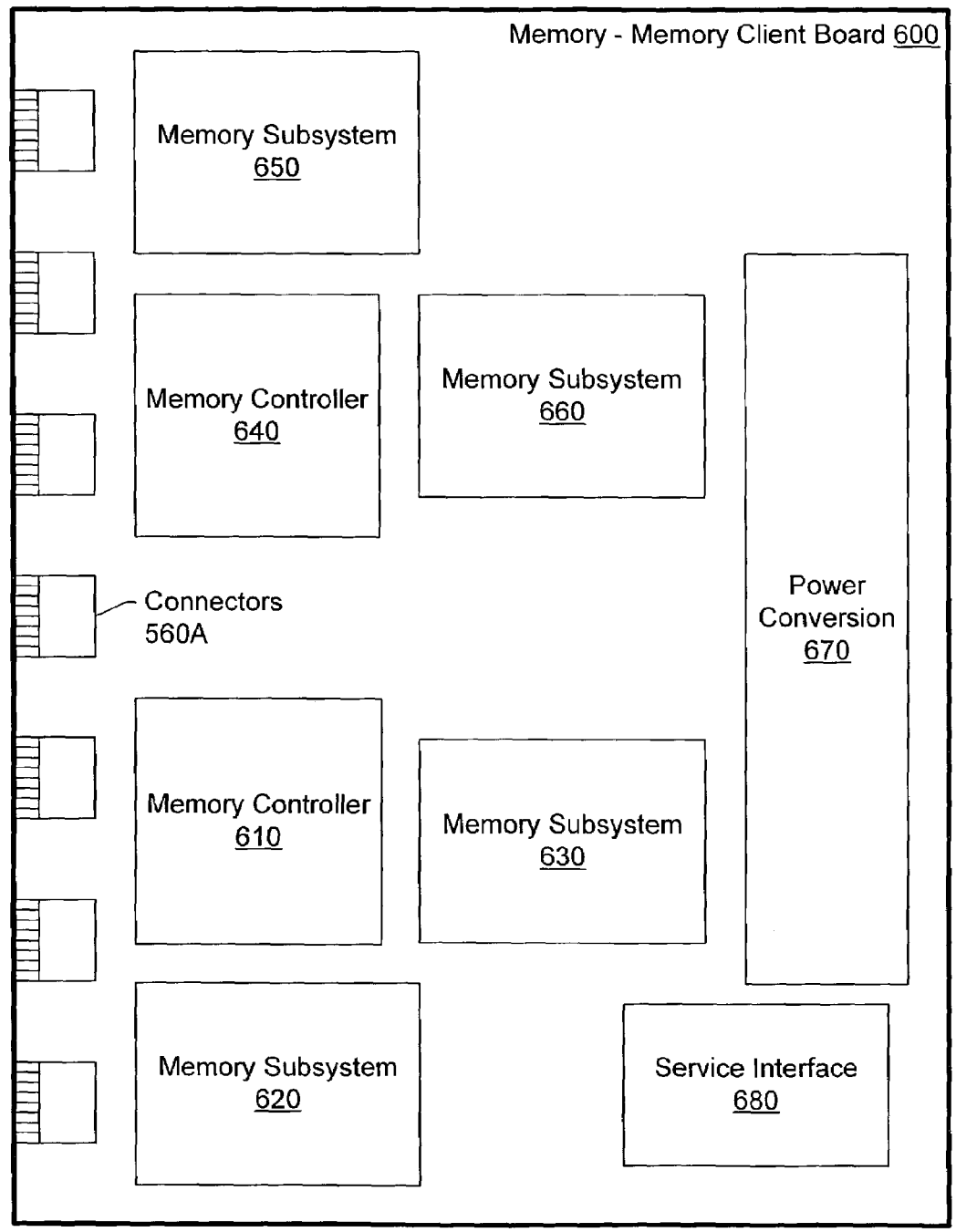
FIG. 4 is a diagram of one embodiment of a dual client memory board of a computer system.

Turning to FIG. 4, a diagram of one embodiment of a dual client memory board 600 is shown. Dual client memory board 600 is a circuit board including two memory clients, such as the memory clients of the computer systems illustrated in FIG. 1 and FIG. 2. Each memory client on dual client memory board 500 is an independent memory client. The first memory client includes a memory controller 610 and two independent memory subsystems 620 and 630. The second memory client includes a memory controller 640 and two additional independent memory subsystems 650 and 660. Dual client memory board 600 also includes a power conversion block 670 and a service interface 680. Further, dual client memory board 600 connects to the rest of the computer system via a plurality of connectors 560A. It is noted that connectors 560A are similar to connectors 560A of FIG. 3 and thus labeled identically.

Each memory controller may be configured to control memory transactions involving their respective memory subsystems. In one embodiment, memory subsystem 620 and memory subsystem 630 may each be implemented using DIMMs which each include a plurality of DRAM chips. The DRAM chips on each DIMM may be grouped into multiple banks. The DIMMs may be implemented to include error detection/error correction capability. The error detection/error correction capability may include using redundant DIMMs to store parity information. Each memory controller may also be configured to control interleaving of data across the memory banks of each of the memory subsystems.

Figure 6:
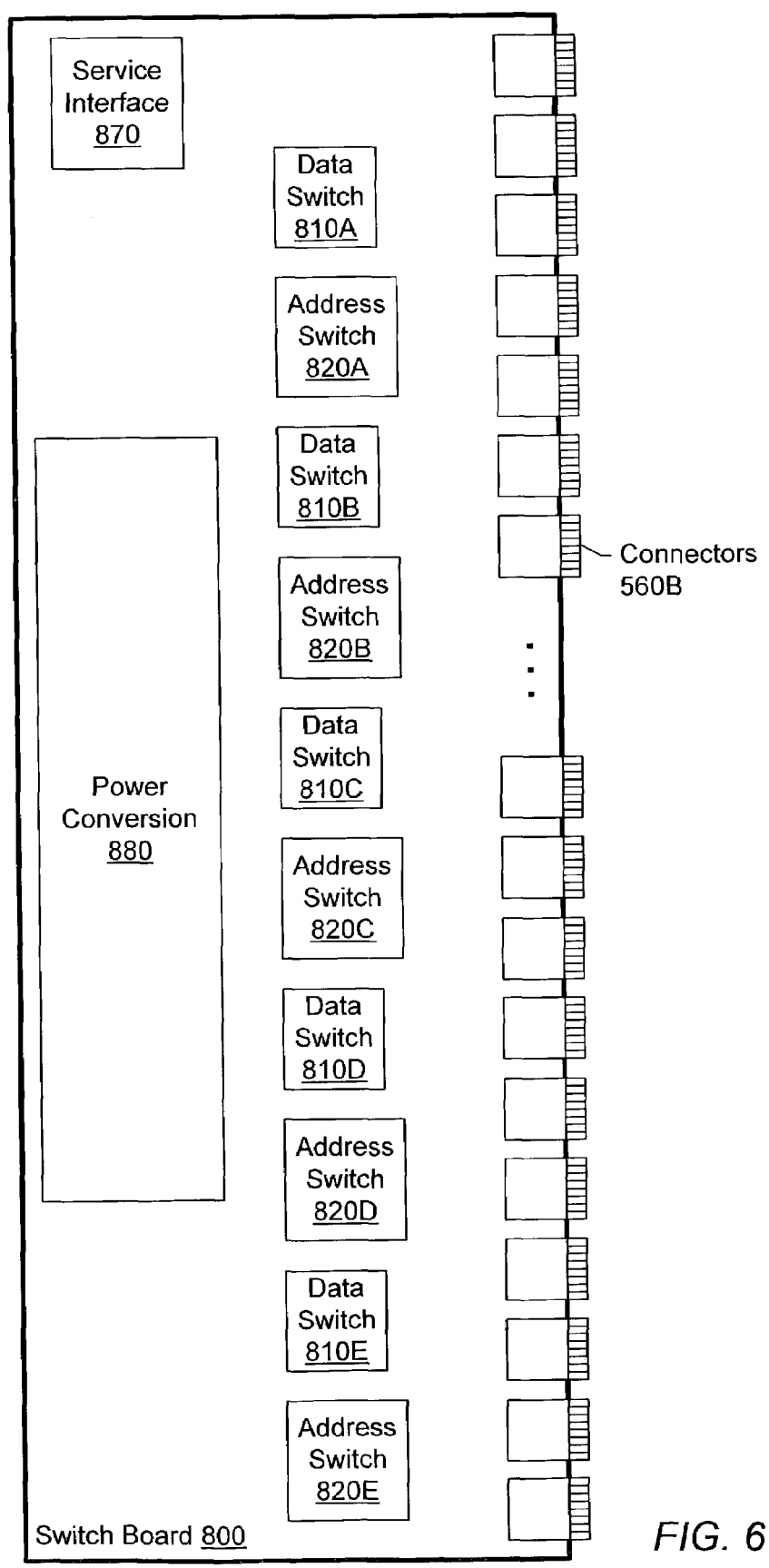
FIG. 6 is a diagram of one embodiment of a switch board of a computer system.

Similar to the description of power conversion block 550 of FIG. 3, power conversion block 670 of FIG. 6 may be a DC-to-DC converter configured to provide a DC operating voltage for components on the dual client memory board 600. In one embodiment, power conversion block 670 may convert 48VDC to 1VDC.

Service interface 680 of FIG. 4 is a service module configured to provide an interface from each memory controller to a service processor (not shown in FIG. 4) via a special service bus (not shown). Similar to the service interface described in FIG. 3, service interface 680 may be a custom integrated circuit configured to translate communications between the service bus protocol and the protocol used by memory controller 610 and 640.

Connectors 560A of FIG. 4 are configured to convey power, ground and signal information between dual client memory board 600 and switch and power boards (not shown in FIG. 6). Each of connectors 6560A may be physically arranged along one edge and mounted to one side of dual client memory board 600. As will be described in further detail below, each of connectors 560A may be detachably mated to a corresponding connector on the switch and power boards.

Referring to FIG. 5, a diagram of one embodiment of a dual client memory-I/O board 700 is shown. The dual client memory-I/O board 700 is a circuit board including a memory client and an I/O bridge client, such as the memory clients and I/O clients of the computer systems illustrated in FIG. 1 and FIG. 2. The memory client includes a memory controller 710 and two memory subsystems 720 and 730. The I/O bridge client includes an I/O bridge 740 and two I/O ports, 790A and 790B. Dual client memory-I/O board 700 also includes a power conversion block 770 and a service interface 750. Further, dual client memory-I/O board 700 includes a plurality of connectors 760.

The memory client of FIG. 5, including memory controller 710 and memory subsystems 720 and 730, operates in a manner that is similar to each of the memory clients described above in conjunction with the description of FIG. 4.

I/O bridge 740 is configured to provide an interface between memory controller and 710 devices that may be connected externally to the computer node. I/O ports 790A and 790B may provide the physical I/O ports for I/O bridge 740. In one embodiment, I/O bridge 740 may translate Infiniband™ transactions into transactions suitable for use by memory controller 710 and vice versa. I/O ports 790AB may be InfiniBand™ ports and may provide 12 parallel Infiniband™ channels per port. Further, I/O ports 790AB may transmit and receive InfiniBand™ transactions via fiber optic cable.

Power conversion block 770 and service interface 750 operate in a manner that is similar to the power conversion blocks and service interfaces described above in conjunction with the descriptions of FIG. 3 and FIG. 4.

Similar to the connectors described above in FIG. 3 and FIG. 4, connectors 560A of FIG. 5 are configured to convey power, ground and signal information between dual client memory-I/O board 700 and switch and power boards (not shown in FIG. 5). Each of connectors 560A may be physically arranged along one edge and mounted to one side of dual client memory board 700. Each of connectors 560A may be detachably mated to a corresponding connector on the switch and power boards. It is noted that although seven connectors are shown on the circuit boards of FIG. 5 through FIG. 7, it is contemplated that in other embodiments, other numbers of connectors may be used.

It is noted that although the various client boards above are described as being dual client boards, it is contemplated that in other embodiments client boards having other numbers of clients may be used. For example, a board having a single client may be used or alternatively, a multi-client board having three or more clients may be used.

Turning to FIG. 6, a diagram of one embodiment of a switch board is shown. Switch board 800 is a circuit board including a plurality of data switches 810A through 810E and a plurality of address switches 820A through 820E such as the address and data switches described in conjunction with the description of FIG. 2. Switch board 800 also includes a power conversion block 880 and a service interface 870. Further, Switch board 800 includes a plurality of connectors 860.

Data switches 810A–E may be configured to provide routing of data packets within the computer system as described above in FIG. 2. Address switches 820A–E may be configured to route address packets as described above in FIG. 2. Hereafter, data switches 810A–E and address switches 820A–E may be referred to collectively as data switches 810 and address switches 820, respectively.

In one embodiment, data switches 810 and address switches 820 may each be a custom integrated circuit capable of being programmed as an address switch or a data switch. When the custom integrated circuit is programmed as an address switch, it may accommodate different address-in and address-out port configurations. Likewise, when the custom integrated circuit is programmed as a data switch, it may accommodate different data-in and data-out port configurations. For example, the integrated circuit may be programmed to have multiple address ports or data ports. In the illustrated embodiment, there are five data switches and five address switches. If used with up to four other switch boards, this particular implementation is intended to provide address and data switching for up to 40 clients in a computer system. However, it is contemplated that other embodiments may use other numbers of address and data switches and other numbers of switch boards to accommodate other numbers of clients. In an alternative embodiment, the custom integrated switch may be specific to either a data switch or an address switch.

Power conversion block 880 and service interface 870 operate in a manner similar to the power conversion blocks and service interfaces described above in conjunction with the descriptions of FIG. 3, FIG. 4 and FIG. 5.

Connectors 560B are configured to convey signal information between the various dual client boards and to convey power and ground from the service processor boards (not shown in FIG. 6). Each of connectors 560B may be physically arranged along one edge and mounted to one side of switch board 800. Each of connectors 560B may be detachably mated to a corresponding connector (560A) on each of the dual client boards and the service processor boards. It is noted that the number of connectors in the present embodiment may be dependent upon the size of switch board 800 which may be dependent upon the number of client boards that the computer system is designed to use. Thus, it is contemplated that any suitable number of connectors may be used.

Figure 7:
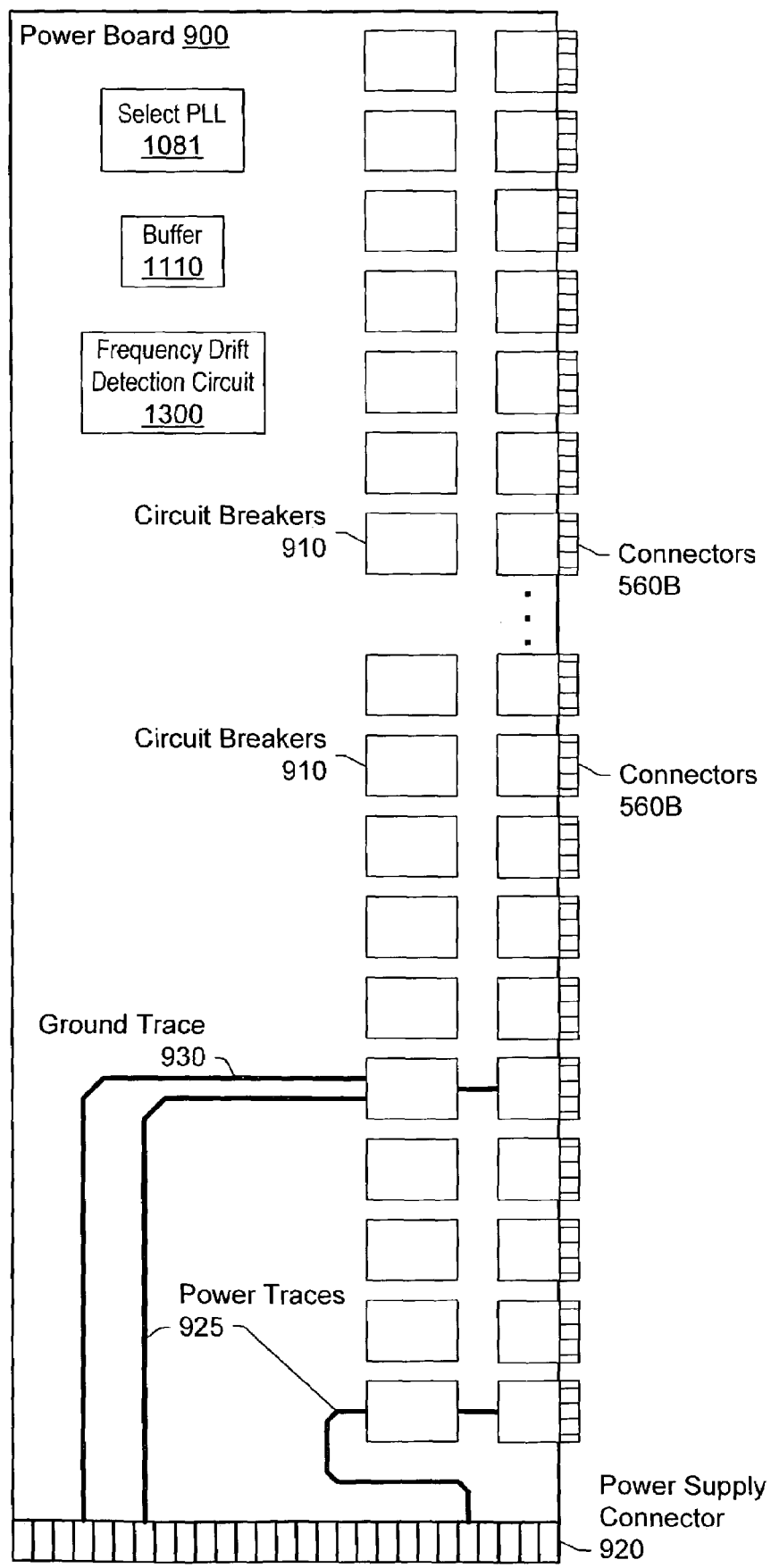
FIG. 7 is a diagram of one embodiment of a power distribution board of a computer system.

Turning to FIG. 7, a diagram of one embodiment of a power distribution board is shown. Power board 900 is a circuit board including a plurality of connectors 960 and a plurality of circuit breakers 910. Power board 900 also includes a power supply connector 920. Power board 900 also includes a plurality of power traces 925 and ground traces 930 which may interconnect circuit breakers 910 to power supply connector 920. In one embodiment, Power board 900 may be configured to distribute 48V power and ground from a system power supply (not shown in FIG. 7) to the client boards and service processor boards (not shown in FIG. 7). Other embodiments distributing power of different voltages are possible and contemplated. It is noted that although power and ground traces are used to convey power and ground between power supply connector 920 and circuit breakers 910, it is contemplated that other embodiments may include multiple layers and may use power and ground buses or power and ground planes or a combination of traces, buses and planes to convey power and ground. It is further noted that power board 900 may also include additional functionality as necessary.

Power supply connector 920 may be positioned along one edge of power board 900 such that when positioned within a computer system, power supply connector 920 may mate with a corresponding connector within a power supply. In the illustrated embodiment, power supply connector 920 is located on the bottom edge of power board 900. However, it is contemplated that in other embodiments, the bottom edge may be a side edge or a top edge depending on the orientation of the computer system as a whole.

Each of circuit breakers 910 may be configured to interrupt the flow of current through a given one of connectors 560B to prevent excessive current from flowing. As will be described in greater detail below, this feature may allow client and service boards to be connected to and disconnected from power board 900 while power is on. In addition, power board 900 may be removed or installed while power is on. Circuit breakers 910 may be configured to disconnect or 'trip' during a short circuit or over-current condition. Further, circuit breakers 910 may be reset, once they are tripped, thereby allowing the circuit to be re-energized after any problem has been corrected.

Connectors 560B are configured to convey power and ground to the various dual client boards and to the service processor boards (not shown in FIG. 7). Each of connectors 560B may be physically arranged along one edge and mounted to one side of power board 900. When power board 900 is installed, each of connectors 560B may be detachably mated to a corresponding connector (560A) on the dual client boards and the service processor boards. It is noted that the number of connectors in the present embodiment may be dependent upon the size of power board 900 which may be dependent upon the number of client boards that the computer system is designed to use. Thus it is contemplated that any suitable number of connectors may be used.

Power board 900 may also include clock circuitry for distributing a global clock signal to each of the client boards. In the embodiment shown, power board 900 includes select PLL 1081, buffer 1110, and frequency drift detection circuit (FDDC) 1300. Select PLL 1081 may be configured to receive a clock signal from a clock board and to provide the clock signal to buffer 1110. Buffer 1110 may be configured to distribute the clock signal to each of the client boards that may be coupled to power board 900. FDDC 1300 may be configured to monitor the phase difference between the clock signal and a feedback clock signal, and may inhibit the clock signal from distributed from the buffer should the phase difference exceed a predetermined limit. The clock distribution functions of power board 900 will be discussed in further detail below.

Figure 8A:
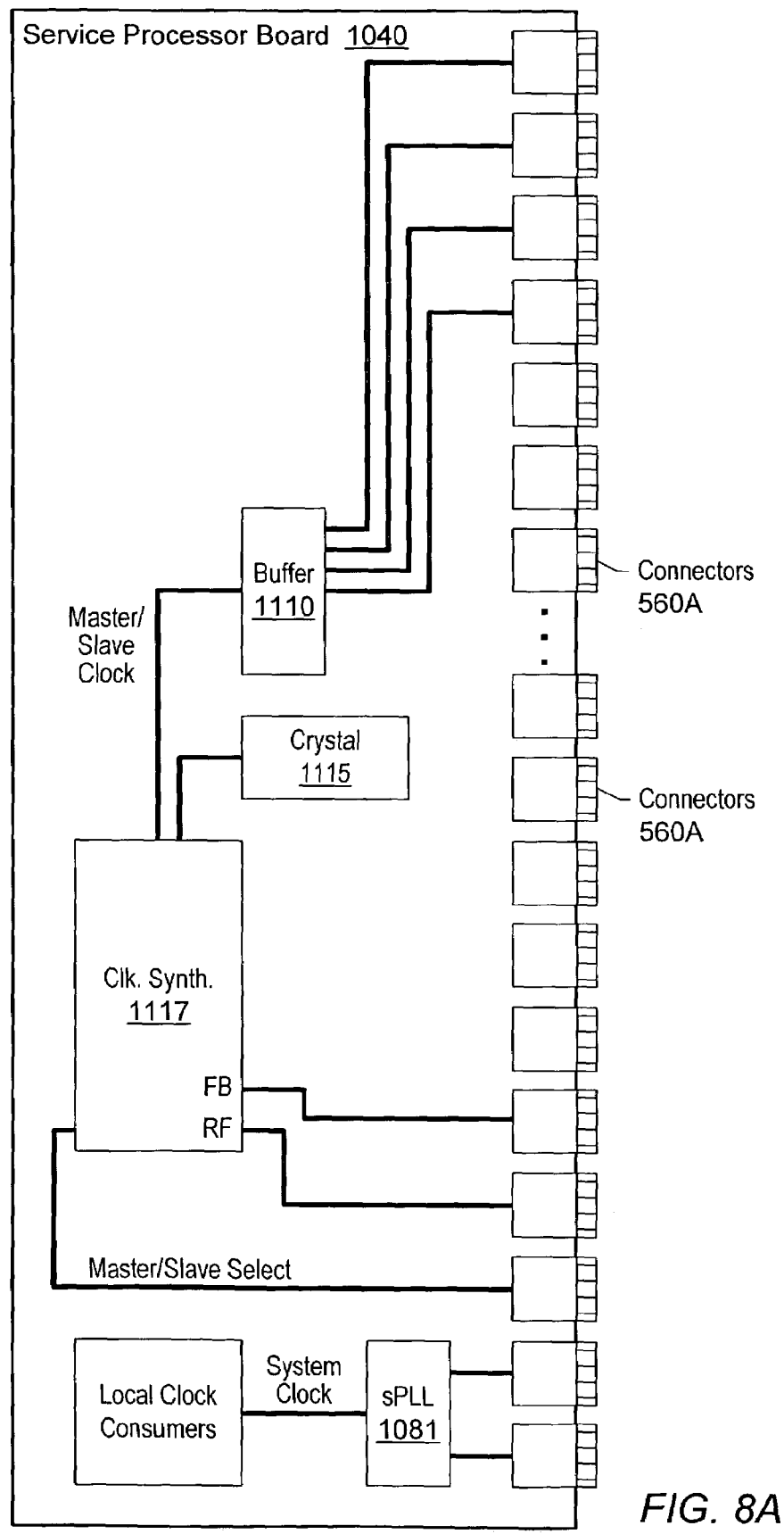
FIG. 8A is a diagram of one embodiment of a service processor board having clock distribution functions.

Turning now to FIG. 8A, a diagram of one embodiment of a service processor board (SPB) having clock distribution functions is shown. SPB 1040 includes clock synthesizer 1117, which may generate a master (i.e. system) clock signal when the clock board is operating as a master, or a slave clock signal when the clock board is acting as a slave. Determination of whether clock synthesizer 1117 (and thus SPB 1040) acts as a master or a slave may be determined by the state of a master/slave select signal which clock synthesizer 1117 is configured to receive. The master/slave clock signal output by clock synthesizer 1117 may be received by buffer 1110, which may drive the clock signal to one or more of connectors 560A. Embodiments having multiple buffers 1110 are possible and contemplated.

Clock synthesizer 1117 may be coupled to receive a crystal clock signal from crystal 1115. Clock synthesizer 1117 may generate the master and slave clock signal based on the received crystal clock signal and the reference clock signal, respectively. The frequency of the master/slave clock signal may be greater, lesser, or the same as the frequency of the received crystal clock signal. The use of crystal 1115 and clock synthesizer 1117 may eliminate the need for a voltage controlled crystal oscillator Clock synthesizer 1117 may further be coupled to receive a feedback clock signal (FB) and a reference clock signal (RF). The feedback clock signal may be utilized by the clock synthesizer 1117 when operating as a master or slave. When operating as a master, the feedback clock path can be routed either inside or outside of the clock synthesizer. When operating as a slave, the feedback clock path should be outside of the clock synthesizer in order to insure the clock phase alignment to the master clock. The feedback clock signal may be a duplicate of the system clock signal generated on the same service processor board, and may be passed through a side plane board (e.g. a power board or a switch board) back to the originating clock synthesizer 1117 through the feedback clock input FB. The reference clock signal may be a duplicate of the system clock signal generated on a different SPB 1040. Details of the origin and intended destinations of the feedback and reference clock signals will be discussed in further detail below.

SPB 1040 may include circuitry for performing for additional functions (shown here as 'local clock consumers') that is outside of the scope of clock generation and redundancy. As such, SPB 1040 may include a select PLL (phase locked loop) 1081 which may be configured to receive clock signals from one or more SPB's 1040. SPLL 1081 may select a clock signal based upon which one is active as the master (system) clock and provide this clock signal to the local clock consumers.

Figure 8B:
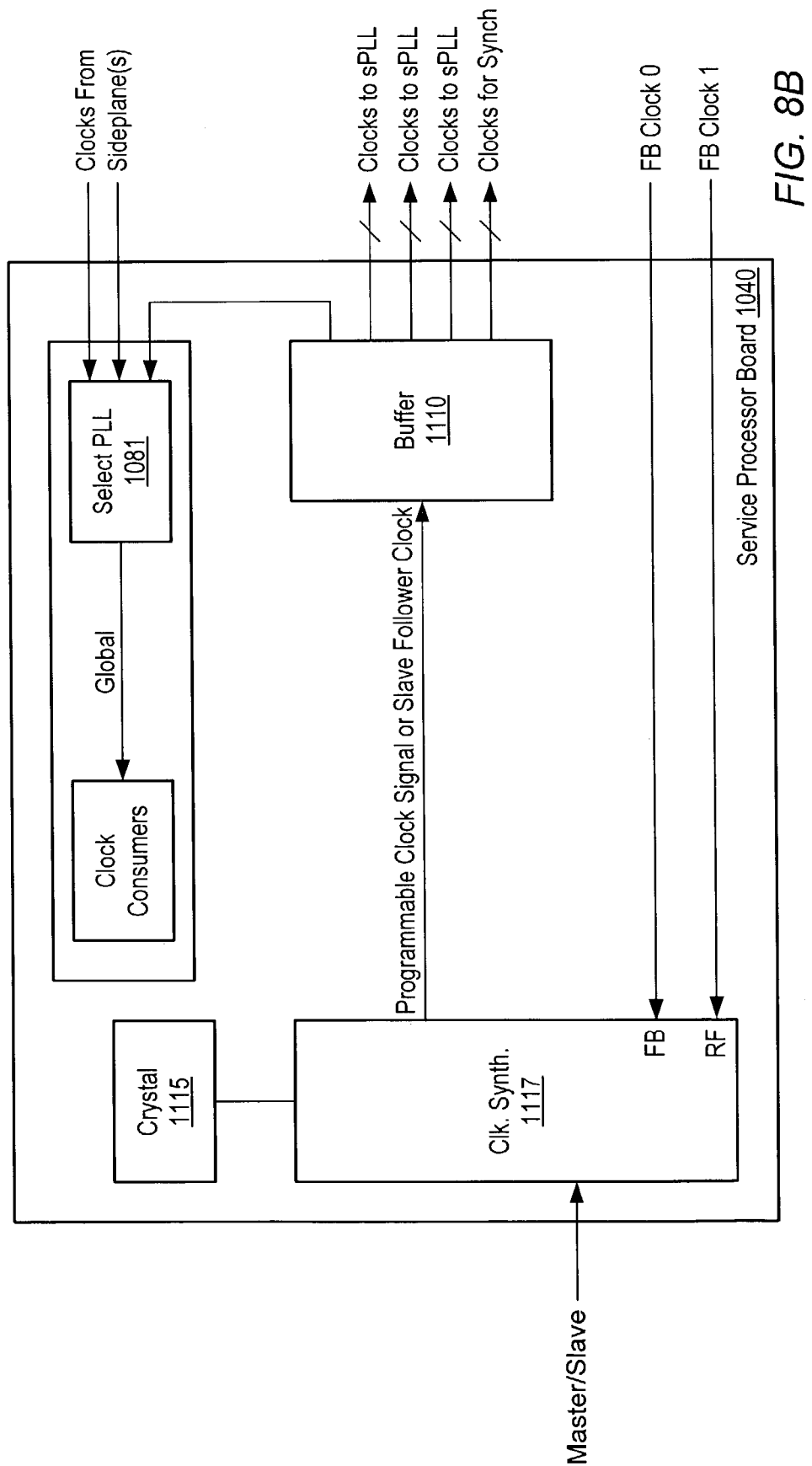
FIG. 8B is a block diagram of one embodiment of a service processor board having clock distribution functions.

FIG. 8B is a block diagram of one embodiment of a service processor board having clock distribution functions. In the embodiment shown, clock synthesizer 1117 may provide either a programmable clock signal or a slave follower clock signal to buffer 1110. The state of the master/slave input signal to clock synthesizer 1117 may determine whether buffer 1110 receives the programmable clock signal or the slave follower clock signal. When clock synthesizer 1117 is acting as a master (and thus the state of the master/slave input signal selects the master mode), it may provide the programmable clock to buffer 1110. The programmable clock signal may be the clock signal generated by clock synthesizer 1117 based on the crystal clock signal received from crystal 1115, and may be provided as the system clock signal via buffer 1110. The programmable clock signal may be of a frequency that is greater, lesser, or the same as the crystal clock signal. The frequency of the programmable clock signal may be set by circuitry internal to clock synthesizer 1117, and may depend upon the specific environment for which clock signals are to be provided.

Buffer 1110 may receive the clock signal output from clock synthesizer 1117 and may in turn provide a clock signal to other portions of the computer system. When clock synthesizer is acting as a master, buffer 1110 may provide a system clock signal to multiple select PLLs throughout the computer system in which it is implemented. Buffer 1110 may also provide clock signals for synchronization of master and slave clock synthesizers. In particular, buffer 1110 may provide a reference clock signal to a slave clock synthesizer (via a side plane board in this embodiment) or be returned to the FB input of the clock synthesizer 1117 from which it originated (which may also be done via a side plane in this embodiment). As with the embodiment of SPB 1040 shown in FIG. 8A, multiple instances of buffer 1110 may be present and may receive the programmable/slave follower clock signal from clock synthesizer 1117.

Figure 8C:
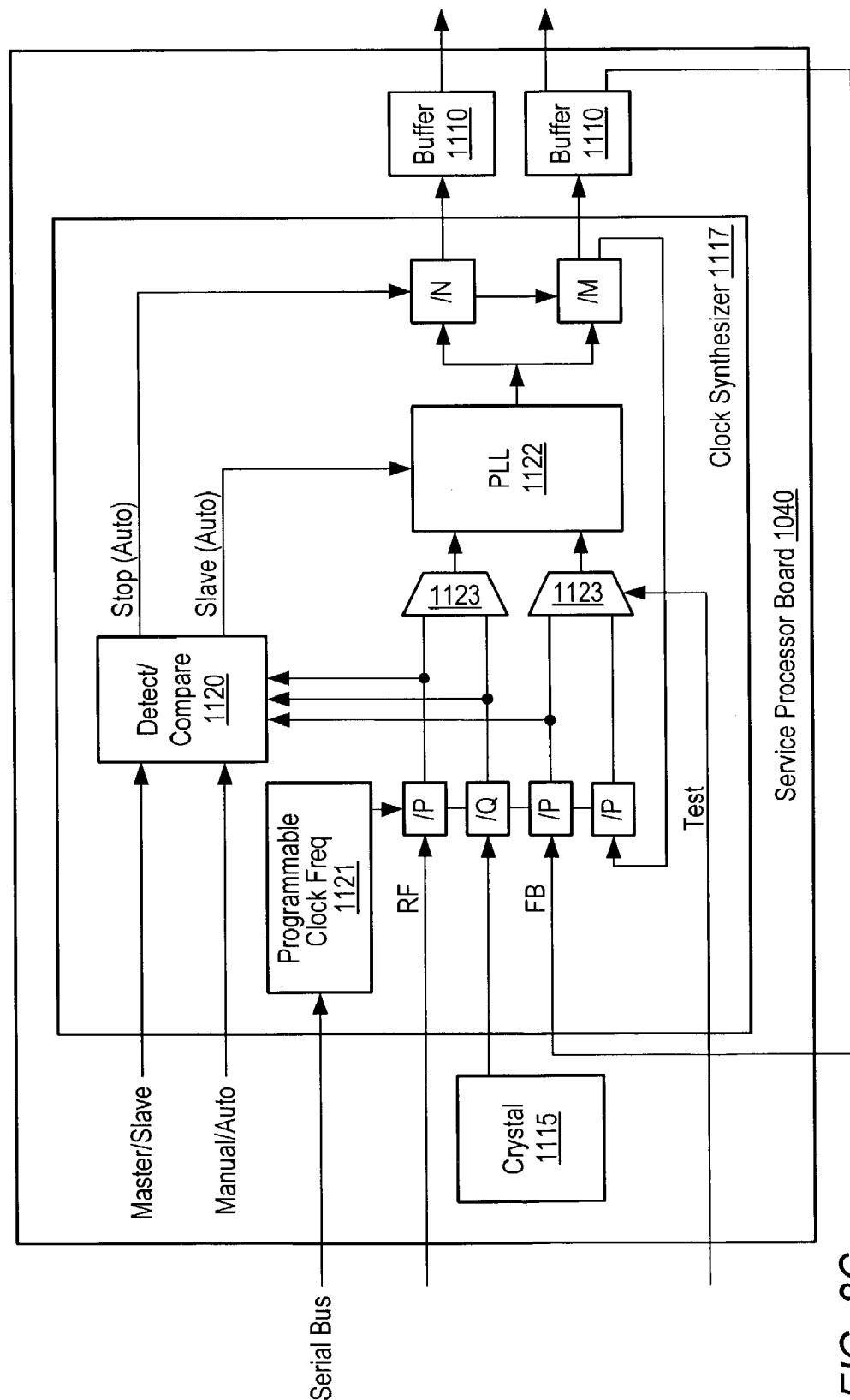
FIG. 8C is a block diagram of one embodiment of a clock synthesizer mounted on an embodiment of a service processor board.

Moving now to FIG. 8C, a block diagram of one embodiment of a clock synthesizer mounted on an embodiment of a service processor board is shown. In the embodiment shown, clock synthesizer 1117 may receive a crystal clock signal from crystal 1115. Clock synthesizer 1117 may receive the crystal clock signal as in input to both a first 2-1 multiplexer 1123 and a detect/compare circuit 1120. The detect/compare circuit 1120 may also receive a reference clock signal (from a different service processor board) and a feedback clock signal (from the same service processor board, via a side plane in this embodiment).

When clock synthesizer 1117 is operating as a master, detect/compare circuit 1120 may compare a phase relationship between the crystal clock signal and the feedback clock signal. If the phase difference between the crystal clock signal and the feedback clock signal is within a predetermined limit, the Stop signal from detect/compare circuit 1120 may remain de-asserted. Similarly, the slave signal from detect/compare circuit 1120 may remain de-asserted, thereby causing the first multiplexer 1123 to allow the crystal clock signal to propagate through. In one embodiment, the phase relationship may be 10 degrees, and thus clock synthesizer may remain in the master mode and continue driving a synthesized clock signal.

When in the master mode, the crystal clock signal may be selected to propagate through a first multiplexer 1123 to PLL 1122. In the embodiment shown, the crystal clock input may pass through a clock divider/multiplier (labeled here as /Q) before propagating to the multiplexer. The slave signal may be used as a select signal for the first multiplexer 1123. When the slave signal is de-asserted, it may allow the crystal clock signal to propagate. When the slave signal is asserted, it may allow the reference clock (RF) signal to propagate to PLL 1122 (after passing through a clock divider/multiplier labeled /P in this particular embodiment). PLL 1122 may provide as an output a clock signal that may be conveyed to one or more clock divider/multiplier circuits, which may in turn convey their outputs to one or more buffer circuits 1110 on SPB 1040. The clock divider/multiplier circuits on the output of PLL 1122 may be enable by the asserted state of the master signal from detect/compare circuit 1120. Buffer circuit 1110 may then provide the clock signals to various portions of the computer system in which SPB 1140 is implemented. When clock synthesizer 1117 is operating as a master, the clock signals provided by buffers 1110 include the system (i.e. global) clock signal.

When clock synthesizer 1117 is operating as a slave, the slave signal output from detect/compare circuit 1120 may be asserted. When the slave signal is asserted, the crystal clock signal from crystal 1115 may be inhibited from propagating through the first multiplexer 1123. Instead, a reference clock signal may propagate through the first multiplexer 1123 to the clock divider/multiplier circuit. The reference clock signal may be a system clock signal received from a different SPB 1040 which is acting as a master clock board. Detect/ compare circuit 1120 may compare the reference clock signal to the feedback clock signal, monitoring the reference clock signal for missing clock edges. If the detect/compare circuit 1120 detects a predefined plurality of consecutive missing clock edges (which may indicate that the master clock source has failed), it may de-assert the slave signal. In one embodiment, the detect/compare circuit 1120 may de-assert the slave signal upon detecting of three consecutive missing clock edges, including both rising and falling edges. Other embodiments which are responsive to a greater or lesser number of clock edges, as well as responding only to rising or falling clock edges are possible and contemplated.

The de-assertion of the slave signal by detect/compare circuit 1120 may have the effect of placing clock synthesizer 1117 in the master mode. Once in the master mode, clock synthesizer 1117 may operate as to provide a system clock signal as described above. When in the master mode, the Stop signal may also be de-asserted, allowing an output clock signal from PLL 1122 to propagate through clock dividers/multipliers /M and /N to each buffer 1110 and eventually into the system for which clock signals are being provided. However, if detect/compare circuit 1120 detects a phase difference between the crystal clock signal and the feedback clock signal greater than a specified maximum (e.g. 10 degrees in one embodiment), it may assert the Stop signal. The assertion of the Stop signal may disable the clock dividers/multipliers coupled to the output and thereby prevent clock synthesizer 1117 from outputting a clock signal.

The settings of the clock dividers/multipliers on the inputs to multiplexers 1123 may be determined by a programmable clock frequency circuit (PCFC) 1121. PCFC 1121 may provide signals to the clock dividers/multipliers which may set the value by which the incoming clock signals are to be multiplied or divided. This value may be an integer value in some embodiments, although embodiments that may use non-integer values (e.g. 2.5) are also possible and contemplated. In the embodiment shown, the multiplier/divider values to be specified by PCFC 1121 may be received via a serial bus from a source external to clock synthesizer 1117. Other embodiments having means other than a serial bus to convey the multiplier/divider information to PCFC 1121 are possible and contemplated.

It should be noted that in the embodiment shown, detect/compare circuit 1120 includes an input for a manual/auto signal. In this particular embodiment, the functions causing a master clock synthesizer to disable the crystal clock and a slave clock synthesizer to enable the crystal clock and assume the role of the master occur only when the manual/auto signal indicates operation in the automatic mode. Other embodiments are possible and contemplated wherein no indication is required in order to perform the above-described functions.

Figure 9:
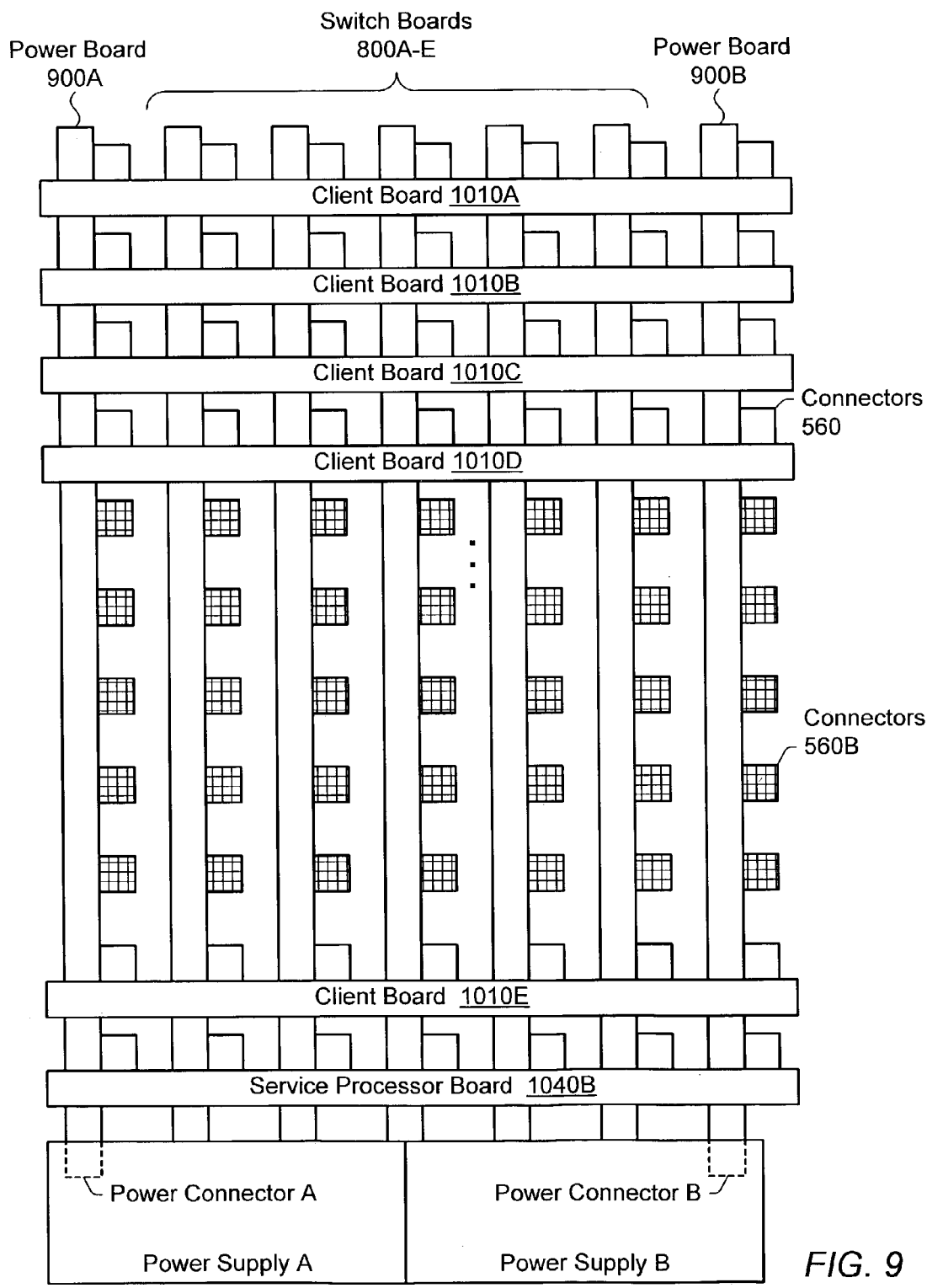
FIG. 9 is a diagram illustrating the rear view of one embodiment of the computer system of FIG. 1.
Figure 10A:
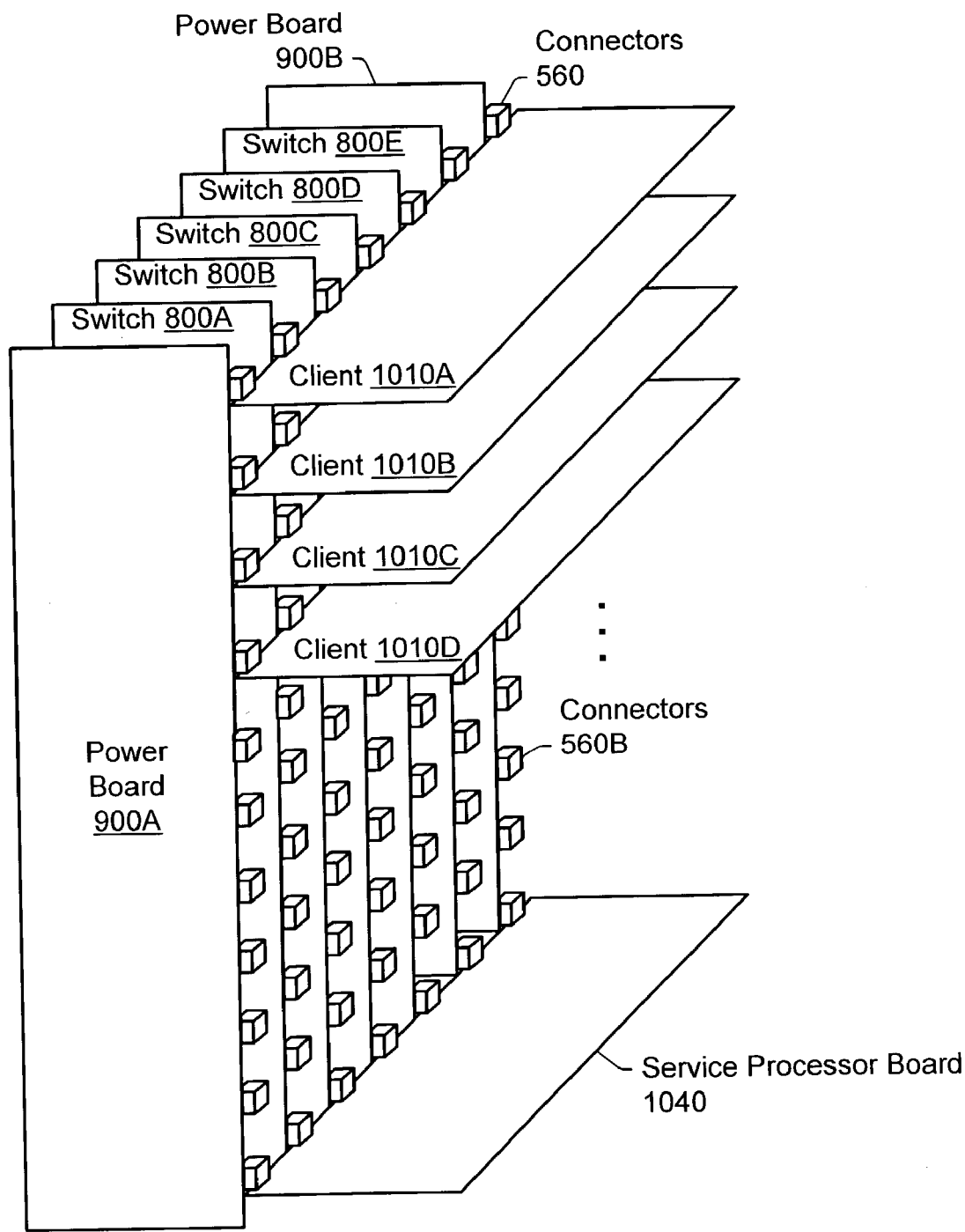
FIG. 10A is a perspective view diagram of one embodiment of the computer system of FIG. 1.
Figure 10B:
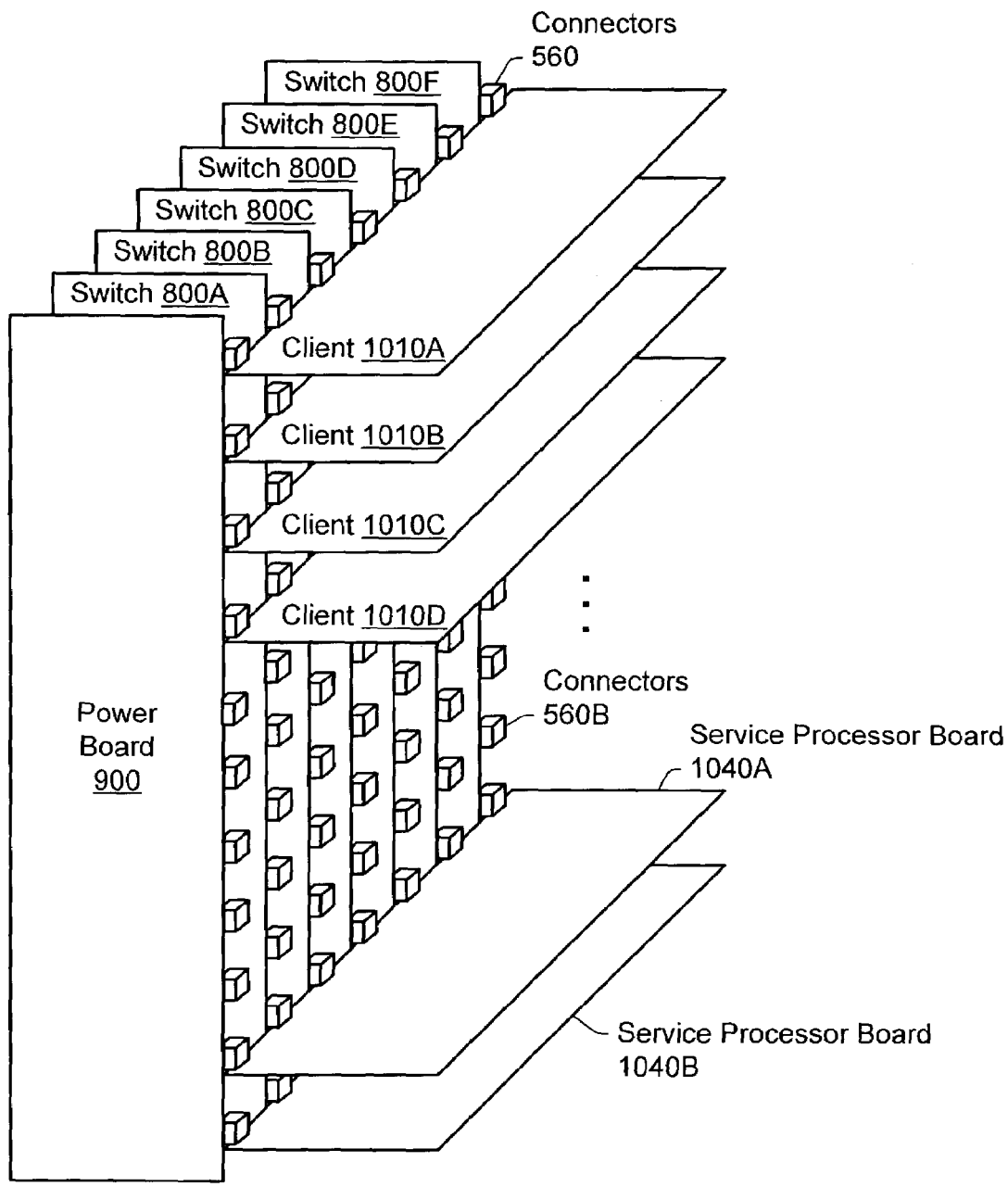
FIG. 10B is a perspective view diagram of another embodiment of the computer system of FIG. 1.
Figure 11:
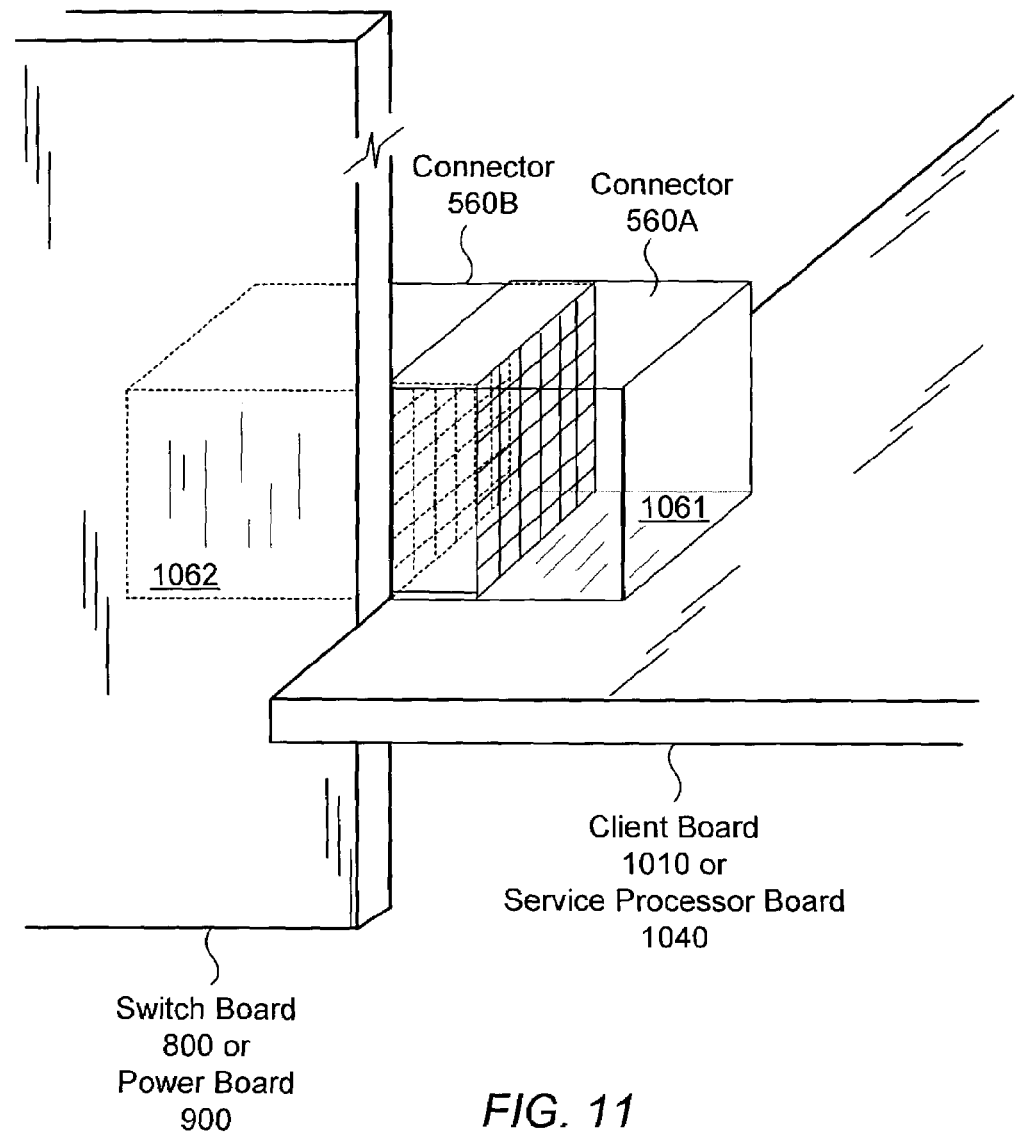
FIG. 11 is an exploded view diagram of one embodiment of a board connector and the orientation of two mated boards.

FIG. 9 through FIG. 11 illustrate different views of one embodiment of computer system 10 of FIG. 1. In FIG. 9, the rear view is shown. In FIG. 10A, a perspective view is shown, and in FIG. 10C an exploded view of the orientation of two mated boards is shown. Circuit components that correspond to those shown in FIG. 1–FIG. 8B are numbered identically for clarity and simplicity.

Turning now to FIG. 9 a diagram illustrating the rear view of one embodiment of computer system 10 of FIG. 1 is shown. FIG. 9 illustrates the physical positioning of the various circuit boards described above. As noted above, the arrangement of the various circuit boards may provide a centerplaneless computer system design. Computer system 10 includes five switch boards labeled 800A–E, two power boards labeled 900A and 900B, four client boards labeled 1010A–D and two service processor boards labeled 1040A–B. Computer system 10 also includes two power supplies: A and B. In addition, connectors 560A of FIG. 3–FIG. 5 and connectors 560B of FIGS. 8–9 are shown collectively as connectors 560 when mated together.

It is noted that although only four client boards 1010, two power boards 900 and five switch boards 800 are shown, other embodiments are contemplated which may use other numbers of these boards. In particular it should be noted that in some systems the number of service processor boards or power distribution boards may be limited. For example, in one embodiment, computer system 10 may include two or more power boards, but only one service processor board. In another embodiment, computer system 10 may include two or more service processor boards but only one power board. Often times, straightforward design for redundancy may compromise design objectives for cost and system complexity. Limiting the number of power boards or clock boards may reduce these problems. Redundancy may be achieved by other methods, as will be explained in further detail below.

Power boards 900A–B and switch boards 800A–E are shown in the vertical plane. Switch boards 800A–E are located between power boards 900A–B. Switch boards 800A–E and power boards 900A–B are also shown substantially parallel to one another and forming an array of boards. Client boards 1010A–D and service processor boards 1040A–B are shown in the horizontal plane. The vertical boards are substantially orthogonal with respect to the horizontal boards may form a matrix of rows and columns when viewed from the front or the rear. Client boards 1010A–D and service processor boards 1040A–B are also shown substantially parallel to one another and also form an array of boards. The two arrays of boards are substantially perpendicular to each other. As described above in conjunction with the descriptions of FIG. 3 through FIG. 8A, each circuit board has a series of connectors (e.g. 560A and 560B) that convey power, ground and signals between boards and are used to detachably mate the two arrays of boards together. It is contemplated that in other embodiments, the entire system may be re-oriented such that the terms vertical and horizontal may not describe the same boards. However, the relationship between and among boards may be the same.

Power supply A and power supply B of FIG. 9 may be configured to provide redundant 48V power to the computer system, although embodiment providing power at other voltage levels are possible and contemplated. Power supply A provides 48V and ground to power board 900A via power connector A and power supply B provides 48V and ground to power board 900B via power connector B. Each of power supplies A and B includes an AC power cord for connection to an independent AC source. Each of power supplies A and B may convert AC to 48VDC.

As described above, power boards 900A–B are each configured to distribute 48VDC to client boards 1010A–D and to service processor boards 1040A–B. Service processor boards 1040A–B may be configured to redundantly distribute the 48VDC, A and B, to each of switch boards 800A–E. This power distribution scheme allows both the vertical and horizontal boards to be redundantly powered. If there is a failure of any part of the power distribution system, the computer system may continue to operate normally. Further, the failed power component may be removed and replaced during system operation. Thus, the power distribution scheme in the illustrated embodiment is intended to prevent any single point of failure within the power distribution system from causing a catastrophic shut down or system crash. It is noted that in alternative embodiments, it is contemplated that client boards 1010A–D may be used to distribute 48VDC, A and B to each of switch boards 800A–E.

In addition, any component in the computer system (e.g. a power board 900, a power supply, service processor board 1040, a switch board 800 and a client board 1010) may be removed and replaced while the computer system continues to operate. This feature is sometimes referred to as "hot swapping" a component. Thus, the physical implementation illustrated in FIGS. 9 to 11 is intended to provide hot swappable capability to any system component.

Further, circuit breakers 910 of FIG. 7 may trip if current faults are detected. For example, a faulty component, pins and connections within connectors 560 damaged during insertion of two boards, may each draw excessive current. If unprotected, excessive currents may burn system components, short out a given power supply and cause a catastrophic system shutdown.

As described above and further illustrated in the perspective view of FIG. 10A, the physical configuration of the system may provide independent maintenance access to each system board in the computer system such that any system board may be removed and replaced without removing other system boards. This may be in contrast to a computer system which uses a common centerplane, which may not be removed independently of any other system boards.

The computer system shown in FIG. 10A includes a plurality of switch boards 800 and a plurality client boards 1010 (which may be any type of client board as discussed above). The embodiment shown also include two power boards 900 and one SPB 1040. The dual power boards 900 may provide power redundancy in the event of a failure of one of their respective power supplies, or the power board itself. Any clock redundancy present may be provided by the features of SPB 1040 as discussed above in reference to FIGS. 8A, 8B, and 8C. SPB 1040 may also be used to distribute power received from power boards 900 to switch boards 800.

In contrast, the embodiment shown in FIG. 10B may include only a single power board 900 and two SPB's, 1040A and 1040B. The dual SPBs 1040A and 1040B may provide extra clock redundancy. A first SPB (e.g. SPB 1040A) may distribute the global clock signal to the switch boards 800 and the power board 900 (which in turn may distribute the global clock signal to the client boards 1010). If the first SPB fails, the second SPB (e.g. SPB 1040B) may assume the function of distributing the global clock signal. In addition, both SPB 1040A and 1040B may provide the board-level clock redundancy as discussed above.

It should also be noted that system including multiple power boards 900 and multiple SPBs 1040 are possible and contemplated. Such embodiments may provide additional redundancy for both the functions of power distribution and clock distribution.

In addition to providing redundant power distribution to switch boards 800A–E, service processor boards 1040A–B may be configured to be redundant system controllers each capable of independently configuring system resources. Service processor boards 1040A–B may also be configured to provide test and diagnostic functions to diagnose system component failures through the service interface circuits located on each of client boards 1010A–D and switch boards 800A–E. The service processor boards 1040A–B may also be used to partition the computer system into different domains. Additionally, service processor boards 1040A–B may be used to initialize system components, such as clients, and to reconfigure the system when circuit boards are removed and/or installed.

It is noted that, power boards 900A–B are located in the two outermost positions or 'slots' to the left and right of switch boards 800A–E. It is noted that the components on the various client boards may be positioned to minimize lead lengths between switch boards 800A–E and each client board. In addition, positioning switch boards 800A–E side-by-side with no intervening boards of another type may also minimize lead lengths. Further, the positioning of power boards 900A–B and switch boards as shown may provide symmetry in the line lengths which may provide more uniform clock domain distribution among the various boards. However in alternative embodiments it is contemplated that power boards 900A–B and switch boards 800A–E may be positioned in any vertical slot as necessary.

Referring now to the exploded view diagram of FIG. 11, two system boards are shown detachably mated together by connector 560. As described above connector 560 includes two portions: connector 560A and connector 560B. Connector 560B may include multiple internal connections and may be mounted to one surface 1062 of the vertical circuit board using any suitable mounting technique. The internal connections of connector 560B make contact with signal traces or other connections (not shown) on the vertical circuit board. In the illustrated embodiment, the vertical circuit board is shown as either a switch board 800 or a power board 900. Connector 560A may also include multiple signal connections and may be mounted to one surface 1061 of the horizontal circuit board using any suitable mounting technique. The internal connections of connector 560B make contact with signal traces or other connections (not shown) on the horizontal circuit board. In the illustrated embodiment, the horizontal board is shown as either a client board 1010 or a service processor board 1040. As shown, connector 560A and connector 560B are mated together such that the boards are positioned in a substantially orthogonal orientation with respect to each other. Further, for each of the multiple signal connections within connectors 560A and 560B, a corresponding ground return path (not shown) which is proximate to each signal connection may be provided.

Figure 12:
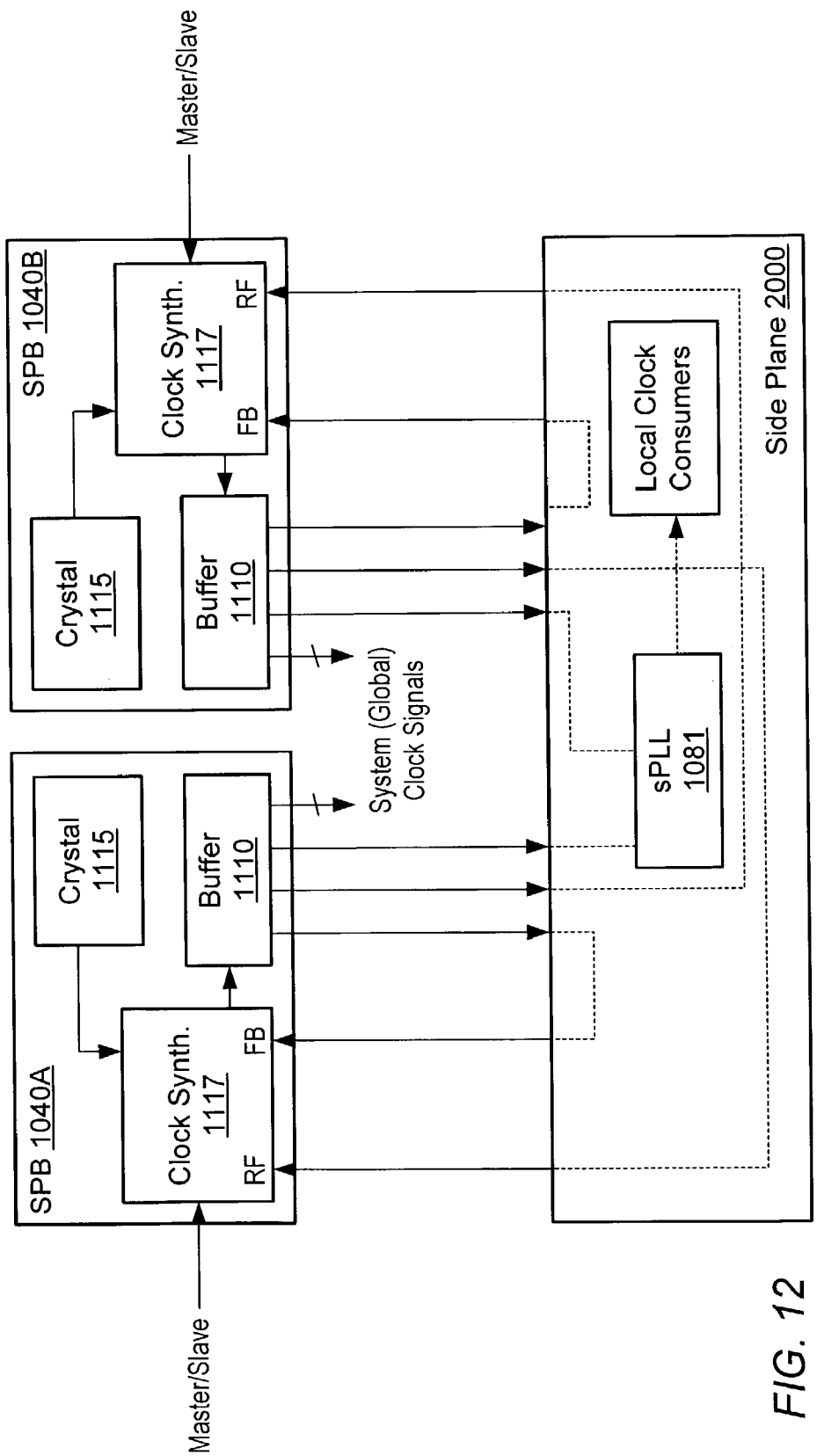
FIG. 12 is a block diagram illustrating clock distribution for one embodiment of a computer system.

Turning now to FIG. 12, a block diagram illustrating clock distribution for one embodiment of a computer system is shown. In the embodiment shown, service processor boards (SPBs) 1040A and 1040B act as clock boards. For the purposes of this discussion, it will be assumed that SPB 1040A is initially acting as the master clock board, while SPB 1040B is acting as the slave clock board.

In the embodiment shown, SPB 1040A, when acting as the master clock board, provides clock signals to the computer system in which it is implemented. This may include providing a system clock signal to side plane 2000, which may be one of the power distribution boards or switch boards described above, or other type of board depending upon the specific embodiment of implementation. Side plane 2000 may include select PLL (sPLL) 1081, which may select the incoming system clock signal from SPB 1040A and in turn provide it to various circuitry on the board ('local clock consumers'). It should be noted that side plane 2000 may also provide the system clock signal to other boards that are not directly coupled to either of SPBs 1040A or 1040B, such as the client boards described above. Side plane 2000 may also include a signal path coupling a system clock output of buffer 1110 on SPB 1040A to reference clock input of the clock synthesizer 1117 located on SPB 1040B. Similarly, a signal path coupling a system clock output buffer 1110 on SPB 1040B to a reference clock input of the clock synthesizer on 1040A is also present on side plane 2000. Side plane 2000 further includes signal paths routing a system clock signal from buffer 1110 from each SPB back to the feedback clock input of its respective clock synthesizer.

When operating as a master clock board, the clock synthesizer 1117 on SPB 1040A may monitor a phase difference between the feedback clock signal received through the FB input and the crystal clock signal received from the crystal 1115 to which it is coupled. Operation as the master clock board may continue for SPB 1040A may continue as long as the phase difference remains within a specified limit. However, if the phase difference exceeds a prespecified limit, the clock synthesizer 1117 of SPB 1040A may inhibit the crystal clock signal. In one embodiment, the crystal clock signal may be inhibited by changing the state of a select signal for a multiplexer through which it propagates, as described above in reference to FIG. 8C.

When the crystal clock signal is inhibited by the clock synthesizer 1117, SPB 1040A may no longer provide the system clock signal. The clock synthesizer 1117 of SPB 1040B may monitor the system clock signal from SPB 1040A (received through the RF input and used as a reference clock signal), comparing it with its respective feedback clock signal. When acting as a slave, clock synthesizer 1117 may compare the reference clock signal to the feedback clock signal, monitoring the reference clock signal for missing clock edges. In one embodiment, the clock synthesizer 1117 of SPB 1040B may enable the crystal clock signal from the crystal 1115 to which it is coupled responsive to detecting a predetermined plurality of consecutive missing clock edges (e.g. 3 consecutive, including rising and falling, as described above). The crystal clock signal may be enabled by selecting it from a multiplexer input in accordance with the description of FIG. 8C. Once the crystal clock signal from its respective crystal 1115 is enabled, SPB 1040B may begin providing the system clock signal, and thus acting as the master clock board. Downstream select PLLs (such as sPLL 1081 of side plane 2000) may select the system clock signal provided by SPB 1040B. When SPB 1040B assumed the role as the master clock board, SPB 1040A may assume the role of the slave clock board, or may be replaced.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:
   a side plane board;
   a first clock board coupled to the side plane board, the first clock board including a first crystal, a first buffer, and a first clock synthesizer circuit, wherein the first clock synthesizer circuit is coupled to receive a first crystal clock signal from the first crystal and provide a first system clock signal to the first buffer; and
   a second clock board coupled to the side plane board, the second clock board including a second crystal, a second buffer, and a second clock synthesizer circuit, wherein the second clock synthesizer circuit is coupled to receive a second crystal clock signal from the second crystal and provide a second system clock signal to the second buffer;
   wherein each of the first and second clock synthesizer circuits are implemented on a clock synthesizer chip, the clock synthesizer chip including:
      a detect/compare circuit, the detect/compare circuit configured to receive a reference clock signal, a feedback clock signal, and a crystal clock signal, wherein the reference clock signal is the system clock signal;
      a first multiplexer coupled to receive the crystal clock signal and the reference clock signal;
      a second multiplexer coupled to receive the feedback clock signal and a test clock signal;
      first and second clock divider circuits each coupled to receive a first output signal from the first and second multiplexers, respectively;
      a programmable frequency circuit, wherein the programmable frequency circuit is coupled to provide dividing integers to the first and second clock divider circuits;
      a phase locked loop circuit coupled to receive second and third output signals from each of the first and second clock divider circuits;
      third and fourth clock divider circuits coupled to receive a fourth output signals, wherein the third clock divider circuit is configured to output the system clock signal and the fourth clock divider circuit is configured to output a test clock signal;
   wherein the first clock board is configured to operate as a master and the second clock board is configured to operate as a slave, wherein the first clock synthesizer is configured to determine a phase relationship between the first crystal clock signal and a first feedback clock signal, and wherein the first clock synthesizer is configured to inhibit the first crystal clock signal if the phase relationship exceeds a predetermined limit; and
   wherein the second clock board, responsive to detecting the inhibiting of the first crystal clock signal, is configured to act as the master by enabling the second crystal clock signal, wherein the master is configured to provide a master clock signal to the side plane board, wherein the master clock signal is the first system clock signal or the second system clock signal depending upon which of the first or second clock boards is the master.

2. The computer system as recited in claim 1, wherein the second clock board, when operating as a slave, is configured to compare the system clock signal received from the first clock board to a second feedback clock signal, and wherein the second clock board is configured to enable the second crystal clock signal responsive to detecting a plurality of consecutive missing clock edges from the system clock signal.

3. The computer system as recited in claim 2, wherein the second clock board is configured to enable the second crystal clock signal responsive to detecting 3 consecutive missing clock edges.

4. The computer system as recited in claim 2, wherein the missing clock edges include rising clock edges and falling clock edges.

5. The computer system as recited in claim 1, wherein the programmable frequency circuit is coupled to receive programming information via a serial bus.

6. The computer system as recited in claim 1, wherein clock synthesizer chip is configured to allow the crystal clock signal to propagate through the first multiplexer when the clock synthesizer chip is a master and allow the reference clock signal to propagate through the first multiplexer when the clock synthesizer chip is a slave.

7. The computer system as recited in claim 6, wherein the detect/compare circuit is coupled to provide a select signal to the first multiplexer, wherein the select signal causes the crystal clock signal to be selected when the clock synthesizer is a master and the reference clock signal when the clock synthesizer is a slave.

8. The computer system as recited in claim 1, wherein each of the first and second clock boards includes a buffer, wherein the buffer is coupled to receive the system clock signal from the third clock divider circuit and the feedback clock signal.

9. The computer system as recited in claim 8, wherein the buffer is further configured to distribute the system clock signal to the computer system and provide the feedback clock signal to the input of the second multiplexer of the clock synthesizer chip, wherein the buffer and the clock synthesizer chip are mounted upon the same clock board.

10. The computer system as recited in claim 1, wherein the detect/compare circuit is coupled to receive a master/slave select input and a manual/auto select input.

11. The computer system as recited in claim 1, wherein the clock synthesizer is coupled to receive a test select signal, wherein the second multiplexer is configured to allow the feedback clock signal to propagate when the test select signal is de-asserted and further configured to allow the test clock signal to propagate when the test select signal is asserted.

12. A method comprising:
 a first clock board monitoring a phase difference between a first crystal clock signal and a first feedback clock signal, wherein the first clock board is acting as a master, and wherein the first crystal clock signal is used to generate a system clock signal, the first clock board including a first clock synthesizer circuit;
 a second clock board receiving the system clock signal and monitoring the system clock signal in reference to a second feedback clock signal, wherein the second clock board is acting as a slave, the second clock board including a second clock synthesizer circuit, wherein each of the first and second clock synthesizer circuits are implemented on a clock synthesizer chip, the clock synthesizer chip including:
  a detect/compare circuit, the detect/compare circuit configured to receive a reference clock signal, a feedback clock signal, and a crystal clock signal, wherein the reference clock signal is the system clock signal;
  a first multiplexer coupled to receive the crystal clock signal and the reference clock signal;
  a second multiplexer coupled to receive the feedback clock signal and a test clock signal;
  first and second clock divider circuits each coupled to receive a first output signal from the first and second multiplexers, respectively;
  a programmable frequency circuit, wherein the programmable frequency circuit is coupled to provide dividing integers to the first and second clock divider circuits;
  a phase locked loop circuit coupled to receive second and third output signals from each of the first and second clock divider circuits;
  third and fourth clock divider circuits coupled to receive a fourth output signals, wherein the third clock divider circuit is configured to output the system clock signal and the fourth clock divider circuit is configured to output a test clock signal;
 the first clock board detecting the phase difference exceeding a predetermined limit and inhibiting the first crystal clock signal;
 the second clock board detecting a plurality of consecutive missing clock edges of the system clock signal;
 the second clock board enabling a second crystal clock signal responsive to said detecting a plurality of missing edges, wherein the second crystal clock signal, upon enabling, is used to generate a system clock signal, and wherein the second clock board acts as a master when the second crystal clock signal is enabled.

13. The method as recited in claim 12, wherein the second clock board is configured to enable the second crystal clock signal responsive to detecting 3 consecutive missing clock edges.

14. The method as recited in claim 12, wherein the missing clock edges include rising clock edges and falling clock edges.

15. The method as recited in claim 12, wherein the programmable frequency circuit is coupled to receive programming information via a serial bus.

16. The method as recited in claim 12, wherein clock synthesizer chip is configured to allow the crystal clock signal to propagate through the first multiplexer when the clock synthesizer chip is a master and allow the reference clock signal to propagate through the first multiplexer when the clock synthesizer chip is a slave.

17. The method as recited in claim 16, wherein the detect/compare circuit is coupled to provide a select signal to the first multiplexer, wherein the select signal causes the crystal clock signal to be selected when the clock synthesizer is a master and the reference clock signal when the clock synthesizer is a slave.

18. The method as recited in claim 12, wherein each of the first and second clock boards includes a buffer, wherein the buffer is coupled to receive the system clock signal from the third clock divider circuit and the feedback clock signal.

19. The method as recited in claim 12, wherein the buffer is further configured to distribute the system clock signal to the computer system and provide the feedback clock signal to the input of the second multiplexer of the clock synthesizer chip, wherein the buffer and the clock synthesizer chip are mounted upon the same clock board.

20. The method as recited in claim 12, wherein the detect/compare circuit is coupled to receive a master/slave select input and a manual/auto select input.

21. The method as recited in claim 12, wherein the clock synthesizer is coupled to receive a test select signal, wherein the second multiplexer is configured to allow the feedback clock signal to propagate when the test select signal is de-asserted and further configured to allow the test clock signal to propagate when the test select signal is asserted.

22. A computer system comprising:
 a plurality of side plane boards;
 a first clock board coupled to the plurality of side plane boards, the first clock board including a first crystal, a first buffer, and a first clock synthesizer circuit, wherein the first clock synthesizer circuit is coupled to receive a first crystal clock signal from the first crystal and provide a first system clock signal to the first buffer; and
 a second clock board coupled to the plurality of side plane boards, the second clock board including a second crystal, a second buffer, and a second clock synthesizer circuit, wherein the second clock synthesizer circuit is coupled to receive a second crystal clock signal from the second crystal and provide a second system clock signal to the second buffer;

wherein the first clock board is configured to operate as a master and the second clock board is configured to operate as a slave, wherein the first clock synthesizer is configured to determine a phase relationship between the first crystal clock signal and a first feedback clock signal, and wherein the first clock synthesizer is configured to inhibit the first crystal clock signal if the phase relationship exceeds a predetermined limit; and wherein the second clock board, responsive to detecting the inhibiting of the first crystal clock signal, is configured to act as the master by enabling the second crystal clock signal, wherein the master is configured to provide a master clock signal to each of the plurality of side plane boards, wherein the master clock signal is either the first system clock signal or the second system clock signal depending upon which of the first or second clock boards is the master.

23. The computer system as recited in claim 22, wherein the each of the first and second clock boards are orthogonally coupled to the plurality of side plane boards.

24. The computer system as recited in claim 22, wherein the plurality of side plane boards includes a plurality of switch boards and at least one power distribution board.

* * * * *

UNITED STATES PATENT AND TRADEMARK OFFICE
CERTIFICATE OF CORRECTION

| | | |
|---|---|---|
| PATENT NO. | : 7,043,655 B2 | Page 1 of 1 |
| APPLICATION NO. | : 10/288938 | |
| DATED | : May 9, 2006 | |
| INVENTOR(S) | : Chung-Hsiao R. Wu | |

It is certified that error appears in the above-identified patent and that said Letters Patent is hereby corrected as shown below:

Claim 19, col. 18, line 41, please change "12" to "18".

Signed and Sealed this

Eighth Day of August, 2006

JON W. DUDAS
*Director of the United States Patent and Trademark Office*